(12) United States Patent
Reagan et al.

(10) Patent No.: US 7,200,317 B2
(45) Date of Patent: Apr. 3, 2007

(54) SYSTEMS AND METHODS FOR OPTICAL FIBER DISTRIBUTION AND MANAGEMENT

(75) Inventors: Randy Reagan, Marlborough, MA (US); Jeff Gniadek, Northbridge, MA (US); Tom Parsons, Leominster, MA (US); Michael Noonan, Shrewsbury, MA (US)

(73) Assignee: Fiber Optic Network Solutions Corporation, Malborough, MA (US)

( * ) Notice: Subject to any disclaimer, the term of this patent is extended or adjusted under 35 U.S.C. 154(b) by 220 days.

(21) Appl. No.: 10/991,135

(22) Filed: Nov. 17, 2004

(65) Prior Publication Data

US 2005/0129379 A1 Jun. 16, 2005

Related U.S. Application Data

(63) Continuation-in-part of application No. 10/714,814, filed on Nov. 17, 2003, now Pat. No. 6,983,095.

(51) Int. Cl.
*G02B 6/00* (2006.01)

(52) U.S. Cl. .................. 385/139; 385/134; 385/135
(58) Field of Classification Search .................. 385/139
See application file for complete search history.

(56) References Cited

U.S. PATENT DOCUMENTS

| | | | |
|---|---|---|---|
| 4,736,100 A | 4/1988 | Vastagh | 250/227 |
| 4,747,020 A | 5/1988 | Brickley et al. | 361/428 |
| 4,792,203 A * | 12/1988 | Nelson et al. | 385/135 |
| 4,824,196 A | 4/1989 | Bylander | 385/134 |
| 4,861,134 A * | 8/1989 | Alameel et al. | 385/135 |
| 4,900,123 A | 2/1990 | Barlow et al. | 385/53 |
| 4,948,220 A | 8/1990 | Violo et al. | 385/55 |
| 4,995,688 A | 2/1991 | Anton et al. | 385/53 |
| 5,023,646 A | 6/1991 | Ishida et al. | 354/402 |
| 5,073,042 A | 12/1991 | Mulholland et al. | 385/69 |
| 5,076,688 A | 12/1991 | Bowen et al. | 356/73.1 |
| 5,142,598 A | 8/1992 | Tabone | 385/78 |
| 5,214,735 A | 5/1993 | Henneberger et al. | 385/136 |
| 5,233,674 A | 8/1993 | Vladic | 385/56 |

(Continued)

FOREIGN PATENT DOCUMENTS

EP 0 788 002 8/1997

(Continued)

OTHER PUBLICATIONS

Brochure from Amphenol Corp. entitled "Amphenol® 954 Series one piece SC Connector," 2 pgs. (1990).

(Continued)

*Primary Examiner*—Frank G. Font
*Assistant Examiner*—Mary El-Shammaa
(74) *Attorney, Agent, or Firm*—Merchant & Gould P.C.

(57) ABSTRACT

The preferred embodiments of the present invention include an optical splitter module having connectorized pigtails that are stored on the bulkhead faceplate of the module. The module includes an optical splitter output harness, for example, a ribbon cable assembly attached to the bulkhead with rugged strain relief mechanism. The ribbon harness is converted to individual pigtails with connectors which are stored on adapter receptacles on the faceplate. Adapter receptacles used may optionally be half receptacles when storage is the only desired function or may be full receptacles when access to the pigtail ferrule tip is required. Access to the ferrule tip may be required for attaching fiber optic terminators to eliminate undesirable reflections caused by unterminated connectors. The module provides an administrative location for splitter outputs prior to being connected individually into service. The module also provides an administrative storage location for splitter outputs taken out of service as a temporary staging area before being reassigned and connected individually into service again.

26 Claims, 36 Drawing Sheets

U.S. PATENT DOCUMENTS

| | | | | |
|---|---|---|---|---|
| 5,274,729 | A | 12/1993 | King et al. | 385/134 |
| 5,274,731 | A | 12/1993 | White | 385/135 |
| 5,317,663 | A | 5/1994 | Beard et al. | 385/70 |
| 5,333,221 | A | 7/1994 | Briggs et al. | 385/55 |
| 5,333,222 | A | 7/1994 | Belenkiy et al. | 385/70 |
| 5,359,688 | A | 10/1994 | Underwood | 385/70 |
| 5,367,598 | A | 11/1994 | Devenish, III et al. | 385/135 |
| 5,402,515 | A | 3/1995 | Vidacovich et al. | 385/135 |
| 5,408,557 | A | 4/1995 | Hsu | 385/72 |
| RE34,955 | E | 5/1995 | Anton et al. | 385/53 |
| 5,420,958 | A | 5/1995 | Henson et al. | 385/135 |
| 5,442,726 | A | 8/1995 | Howard et al. | 385/135 |
| 5,448,015 | A | 9/1995 | Jamet et al. | 174/68.3 |
| 5,469,526 | A * | 11/1995 | Rawlings | 385/135 |
| 5,497,444 | A | 3/1996 | Wheeler | 385/135 |
| 5,511,144 | A | 4/1996 | Hawkins et al. | 073/162 |
| 5,542,015 | A | 7/1996 | Hultermans | 385/60 |
| 5,647,043 | A | 7/1997 | Anderson et al. | 385/78 |
| 5,708,751 | A | 1/1998 | Mattei | 385/135 |
| 5,734,776 | A | 3/1998 | Puetz | 385/134 |
| 5,764,844 | A * | 6/1998 | Mendes | 385/135 |
| 5,774,612 | A | 6/1998 | Belenkiy et al. | 385/72 |
| 5,823,646 | A | 10/1998 | Arizpe et al. | 312/324 |
| 5,825,955 | A | 10/1998 | Ernst et al. | 385/79 |
| 5,883,995 | A | 3/1999 | Lu | 385/60 |
| 5,930,425 | A | 7/1999 | Abel et al. | 385/53 |
| 5,945,633 | A | 8/1999 | Ott et al. | 174/59 |
| 5,956,444 | A | 9/1999 | Duda et al. | 385/53 |
| 5,969,294 | A | 10/1999 | Eberle et al. | 174/57 |
| 6,027,252 | A | 2/2000 | Erdman et al. | 385/76 |
| 6,044,193 | A | 3/2000 | Szentesi et al. | 385/134 |
| 6,061,492 | A | 5/2000 | Strause et al. | 385/135 |
| 6,079,881 | A | 6/2000 | Roth | 385/76 |
| 6,149,315 | A | 11/2000 | Stephenson | 385/60 |
| 6,160,946 | A | 12/2000 | Thompson et al. | 385/134 |
| 6,188,687 | B1 | 2/2001 | Mussman et al. | 370/388 |
| 6,188,825 | B1 | 2/2001 | Bandy et al. | 385/134 |
| 6,208,796 | B1 | 3/2001 | Williams Vigliaturo | 385/135 |
| 6,227,717 | B1 | 5/2001 | Ott et al. | 385/53 |
| 6,234,683 | B1 | 5/2001 | Waldron et al. | 385/78 |
| 6,236,795 | B1 | 5/2001 | Rodgers | 385/134 |
| 6,240,229 | B1 | 5/2001 | Roth | 385/53 |
| 6,271,484 | B1 | 8/2001 | Tokutsu | 177/25.13 |
| 6,278,829 | B1 | 8/2001 | BuAbbud et al. | 385/135 |
| RE37,489 | E | 1/2002 | Anton et al. | 385/53 |
| 6,347,888 | B1 | 2/2002 | Puetz | 385/53 |
| 6,356,697 | B1 | 3/2002 | Braga et al. | 385/135 |
| 6,363,200 | B1 | 3/2002 | Thompson et al. | 385/135 |
| 6,385,381 | B1 | 5/2002 | Janus et al. | 385/135 |
| 6,411,767 | B1 | 6/2002 | Burrous et al. | 385/135 |
| 6,424,781 | B1 | 7/2002 | Puetz et al. | 385/135 |
| 6,425,694 | B1 | 7/2002 | Szilagyi et al. | 385/76 |
| 6,431,762 | B1 | 8/2002 | Taira et al. | 385/56 |
| 6,434,313 | B1 | 8/2002 | Clapp, Jr. et al. | 385/135 |
| 6,452,925 | B1 | 9/2002 | Sistanizadeh et al. | 370/352 |
| 6,453,033 | B1 | 9/2002 | Little et al. | 379/219 |
| 6,464,402 | B1 | 10/2002 | Andrews et al. | 385/53 |
| D466,087 | S | 11/2002 | Cuny et al. | D13/152 |
| 6,480,487 | B1 | 11/2002 | Wegleitner et al. | 370/354 |
| 6,483,977 | B2 | 11/2002 | Battey et al. | 385/135 |
| 6,496,640 | B1 | 12/2002 | Harvey et al. | 385/135 |
| 6,539,147 | B1 | 3/2003 | Mahony | 385/24 |
| 6,539,160 | B2 | 3/2003 | Battey et al. | 385/135 |
| 6,542,688 | B1 | 4/2003 | Battey et al. | 385/135 |
| 6,554,485 | B1 | 4/2003 | Beatty et al. | 385/72 |
| 6,577,595 | B1 | 6/2003 | Counterman | 370/230 |
| 6,597,670 | B1 | 7/2003 | Tweedy et al. | 370/328 |
| 6,614,980 | B1 | 9/2003 | Mahony | 385/135 |
| 6,621,975 | B2 | 9/2003 | Laporte et al. | 385/135 |
| 6,625,375 | B1 | 9/2003 | Mahony | 385/135 |
| 6,631,237 | B2 | 10/2003 | Knudsen et al. | 385/134 |
| 6,654,536 | B2 | 11/2003 | Battey et al. | 385/134 |
| 6,661,961 | B1 | 12/2003 | Allen et al. | 385/135 |
| 6,668,127 | B1 | 12/2003 | Mahony | 385/135 |
| 6,760,531 | B1 | 7/2004 | Solheid et al. | 385/135 |
| 6,778,752 | B2 | 8/2004 | LaPorte et al. | 385/135 |
| 6,788,786 | B1 | 9/2004 | Kessler et al. | 379/413.04 |
| 6,792,191 | B1 | 9/2004 | Clapp, Jr. et al. | 385/135 |
| 6,815,612 | B2 | 11/2004 | Bloodworth et al. | 174/50 |
| 6,850,685 | B2 | 2/2005 | Tinucci et al. | 385/134 |
| 6,870,734 | B2 | 3/2005 | Mertesdorf et al. | 361/684 |
| 6,925,241 | B2 | 8/2005 | Bohle et al. | 385/135 |
| 2002/0034290 | A1 | 3/2002 | Pershan | 379/207.02 |
| 2003/0174996 | A1 | 9/2003 | Henschel et al. | 385/135 |
| 2004/0074852 | A1 | 4/2004 | Knudsen et al. | 211/26 |
| 2004/0228598 | A1 | 11/2004 | Allen et al. | 385/135 |
| 2004/0264873 | A1 | 12/2004 | Smith et al. | 385/53 |
| 2005/0002633 | A1 | 1/2005 | Solheid et al. | 385/135 |
| 2005/0129379 | A1 | 6/2005 | Reagan et al. | 385/135 |

FOREIGN PATENT DOCUMENTS

| | | |
|---|---|---|
| EP | 0871047 | 10/1998 |
| EP | 0975180 | 1/2000 |
| EP | 1 045 267 | 10/2000 |
| JP | 63-229409 | 9/1988 |
| WO | WO 98/53347 | 11/1998 |
| WO | WO 00/75706 | 12/2000 |
| WO | 02103429 | 12/2002 |

OTHER PUBLICATIONS

AMP Inc. catalog entitled "Fiber Optic Products," front and back covers and p. 59, (4 pgs.) (© 1991).

HRS catalog entitled "Optical Fibre Connectors," front and back covers and pp. 16, 17 and 49 (5 pages) (Mar. 1991).

AT&T Network Systems catalog entitled "Fiber Optic Products Innovation for wide ranging applications," front and back covers and pp. 6-1 through 6-16 (18 pages) (© 1995).

NTT Int'l Fiber Termination Module (FTM) & Premises Optical Distribution Cabinets (PODC) product brochure, 3 pages, undated.

ADC Telecommunications, Inc.'s Outside Plant, Fiber Cross-Connect Solutions Products Brochure; front cover, Table of Contents, pp. 1-48, and back cover.; revised Jun. 2002, Item No. 1047.

ADC Telecommunications, Inc.'s 6th Edition of Next Generation Frame (NGF) Product Family Ordering Guide; front cover, Table of Contents, pp. 1-41, and back cover; revised Feb. 2003, Item No. 820.

ADC Telecommunications, Inc.'s Fiber Optic, Cable Assemblies and Accessories Brochure; front cover, Table of Contents, pp. 1-23, and back cover; revised Apr. 2003, Item No. 100300.

ADC Telecommunications, Inc.'s OMX™ 600, Optical Distribution Frame Brochure; front cover, Table of Contents, pp. 1-14, and back cover; revised Feb. 2000, Item No. 854.

Iwano, S. et al., "MU-type Optical Fiber Connector System," *NTT Review*, vol. 9, No. 2, pp. 63-71 (Mar. 1997).

Sugita, E. et al., "SC-Type Single-Mode Optical Fiber Connectors," *Journal of Lightwave Technology*, vol. 7, No. 11, pp. 1689-1696 (Nov. 1989).

FONS Corporation's MDC Series Rack or Wall Mount Enclosures product sheet, 3 pages, (2002).

FONS Corporation's Modular Distribution Cabinets Rack Mount Enclosures, Model MDC-7, product sheet, 2 pages (2005) (shows the same device as shown in Exhibit L).

FONS Corporation's Technical Drawing No. 11669, Rev. D, of Distribution Cabinet Assembly MFDC-7, 1 page (technical drawing depicting the device shown in Exhibit M).

ADC Telecommunications, Inc.'s Secure Fiber Entrance Terminal (SFET) Brochure; front cover, pp. 2-7, and back cover; revised May 1998, Item No. 1005.

ADC Telecommunications, Inc.'s 2nd Edition of Fiber Panel Products; front cover, Table of Contents, pp. 1-111, and back cover; revised Jul. 1996, Item No. 846.

* cited by examiner

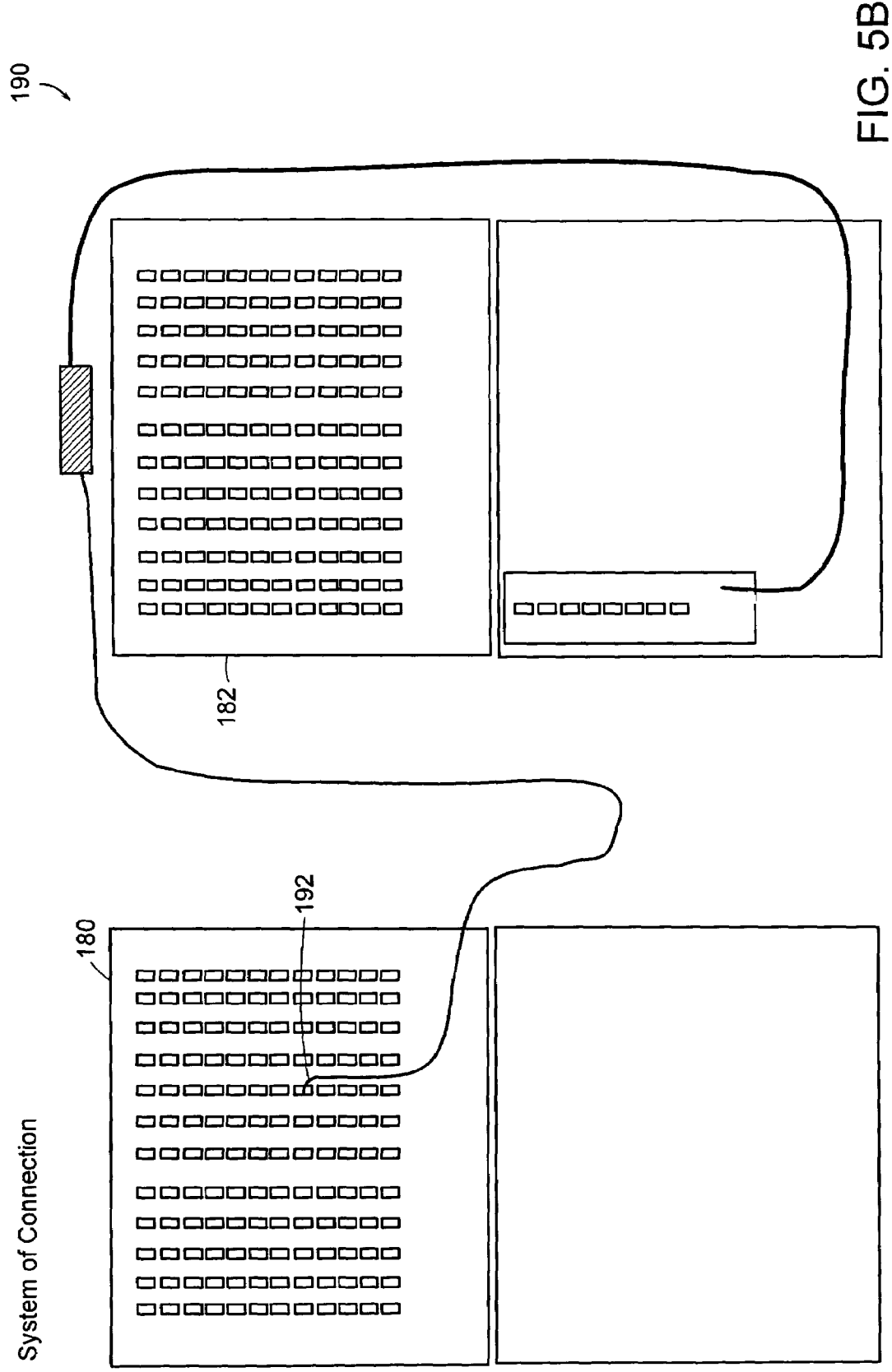

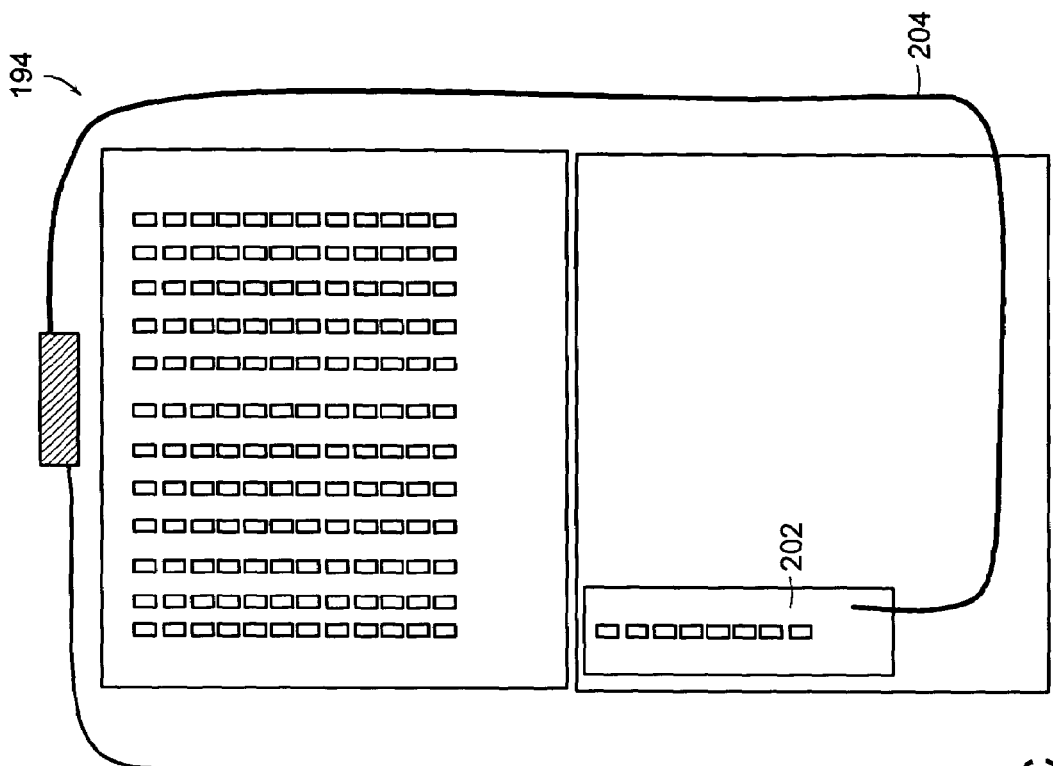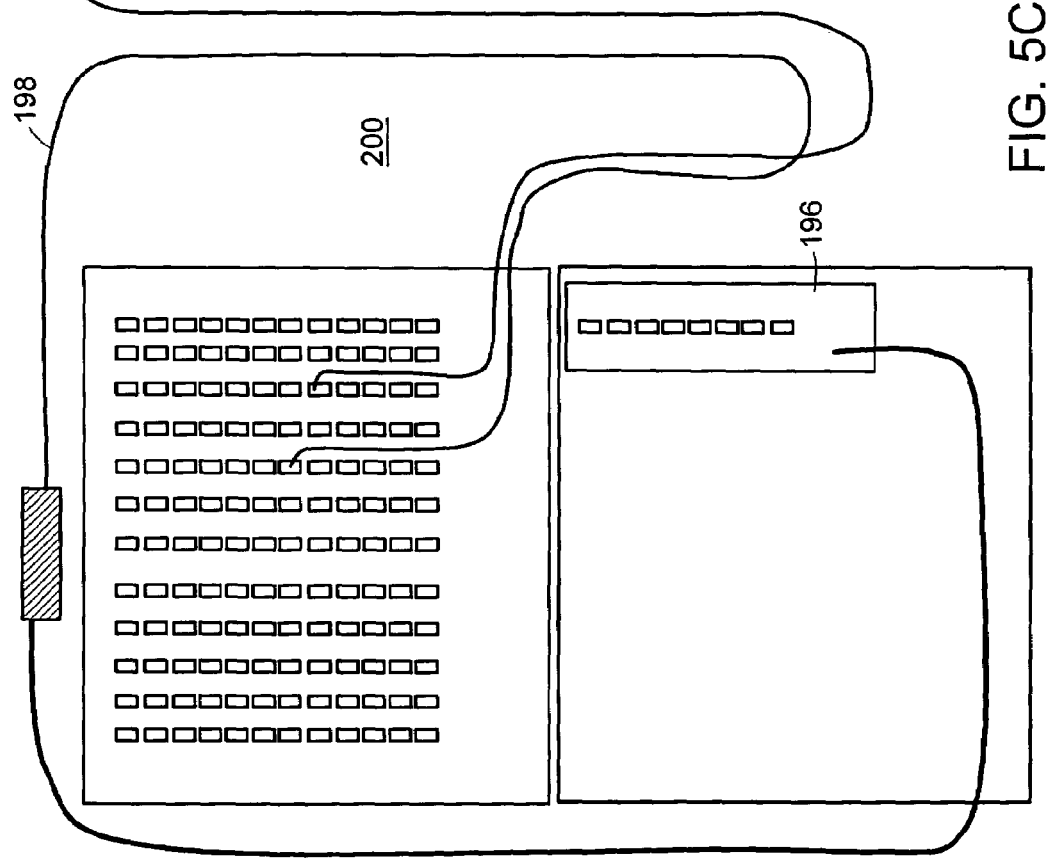
FIG. 5C

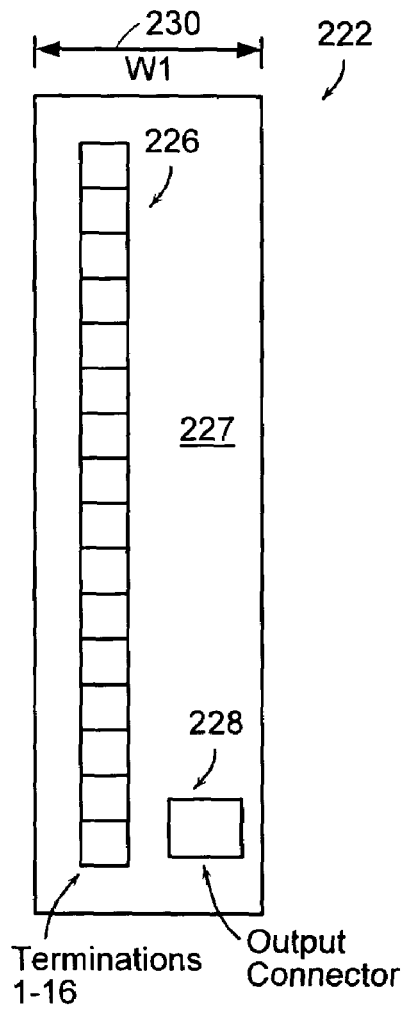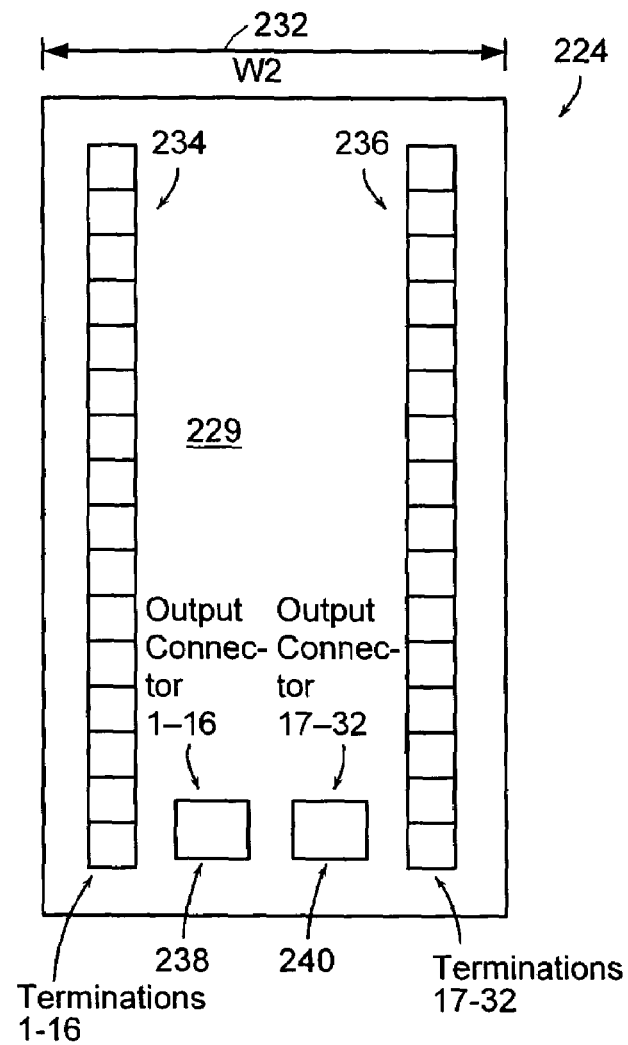
FIG. 6A

280

290

Fiber Distribution Hub

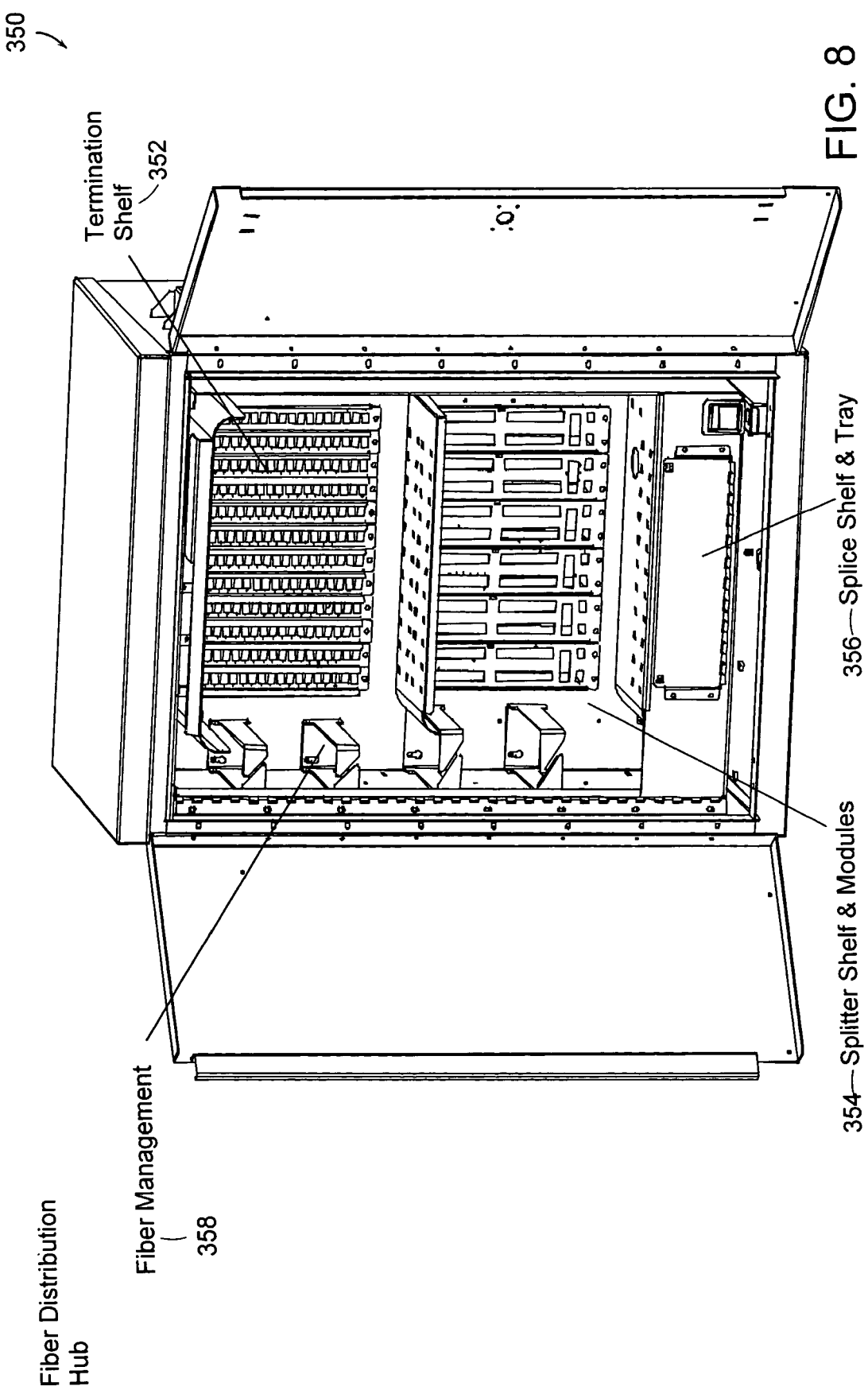

Fiber Distribution Hub
Side-by-Side Equipment Layout

SYSTEMS AND METHODS FOR OPTICAL FIBER DISTRIBUTION AND MANAGEMENT

CROSS REFERENCES TO RELATED APPLICATIONS

The present application is a continuation-in-part of U.S. patent application Ser. No. 10/714,814, filed Nov. 17, 2003 now U.S. Pat. No. 6,983,095. The content of the above application is incorporated herein by reference in entirety.

BACKGROUND OF THE INVENTION

In Fiber-to-the-Premises broadband network applications optical splitters are used to split the optical signals at various points in the network. Recent network specifications call for optical splitters to be incorporated in fiber distribution hubs (FDHs) which are re-enterable outdoor enclosures. These enclosures allow easy re-entry for access to optical splitters allowing splitter ports to be utilized effectively and for additional splitter ports to be added on an incremental basis.

In typical applications to date, optical splitters are provided prepackaged in optical splitter module housings and provided with splitter outputs in pigtails that extend from the module. The splitter output pigtails are typically connectorized with high performance low loss SC or LC connectors. This optical splitter module, or cassette, provides protective packaging for the optical splitter components in the housing and thus provides for easy handling for otherwise fragile splitter components. This approach allows the optical splitter modules to be added incrementally to the fiber distribution hub, for example, as required.

A problem may arise due to the lack of protection and organization of the connectorized ends of the splitter output pigtails. For example, these pigtails can sometimes be left dangling in a cable trough or raceway within the enclosure. This method of leaving an exposed optical component such as a high performance connector exposed in an open area leaves it susceptible to damage. These high performance connectors if damaged can cause delays in service connection while connectors are repaired. Leaving connectorized splitter output pigtails dangling in a cabling trough also exposes them to dirt and debris in the cabling trough. In current network deployments it is imperative to maintain clean optical connectors to maximize the performance of the network.

In addition, the. fiber pigtails in the current art are not organized in a manner conducive to rapid service delivery. In many cases splitters may have sixteen or thirty-two output pigtails bundled together making it difficult to find a particular pigtail. Also the bundle of loose hanging pigtails can easily become entangled causing further delays in service delivery. These tangles can actually cause congestion and in some cases resulting in bend induced loss on the pigtails causing lower system performance.

To solve some of these issues a separate storage tray or enclosure has been utilized to take up slack and/or store and protect splitter output pigtail connectorized ends. However, these auxiliary devices tend to take up additional space and often hide the pigtail in an enclosure that can cause further delays in deployment depending on how much time is required to access on the tray or enclosure. Thus, there still remains a need for a solution that does not take up additional space and that provides direct access and identification to splitter output pigtail ends.

In addition, some network applications may require equipping splitter outputs with fiber optic terminators in order to reduce or eliminate reflections caused by unterminated splitter outputs. Other methods of storing connectorized pigtails in cable troughs or auxiliary trays may make it difficult to equip splitter output ports with fiber optic terminators.

Finally current methods tend to result in a disassociation of the splitter module from the splitter output pigtail end. This usually results because the pigtail, once deployed, gets lost in the midst of other pigtails in the fiber jumper trough. When subscribers are taken out of service it is desirable to disconnect the splitter output and redeploy or store it for ready redeployment. It is further desirable for administrative purposes to maintain association of splitter module to splitter output pigtails so that resources are used effectively over time.

Fiber distribution hubs may be located at, or near, ground level or they may be affixed near the top of utility poles. Since FDHs are often located outdoors, the enclosures must be weather proof. And, reducing the number of seams in the exterior of the FDH reduces the chances of moisture penetration thus helping to provide a weather proof interior volume for the enclosure. As a result, most FDHs are accessible from only a front face by way of a door. Therefore, servicing connectors located behind a bulkhead can be problematic since removal of the bulkhead may be required. Bulkhead removal becomes increasingly difficult as service providers attempt to increase the number of connectors, or drops, located within a single enclosure. As the number of drops increases, enclosure size and bulkhead size increase. In addition, the weight and complexity of cabling may increase.

When FDHs are mounted on utility poles, large panel sizes can become unwieldy for linesman because the door must be swung open to gain access to the enclosure interior while the linesman is tethered to the pole and/or enclosure. In order to accommodate linesman, many pole mounted FDHs are equipped with balconies for providing a surface on which the linesman can stand while working inside an enclosure. A linesman typically climbs a ladder until he can step onto the balcony. Transferring from the ladder to the balcony while wearing a tool belt can be cumbersome and dangerous. Safety procedures dictate that the linesman attach a fall restraining line, or safety line, from his safety harness to a structure on the pole before transferring from the ladder to the balcony. In some instances, a linesman may connect his safety line to a structure that is not rated for stopping his fall.

What is needed are FDHs that are designed to be easily accessible from ground level and when working on elevated platforms such as utility poles. These FDHs should provide for efficient deployment and interconnection of fiber optic connections therein. Furthermore, FDHs should allow a linesman to open the enclosure without undue risk of losing balance and internal bulkheads should facilitate easy and safe access to connectors located in the rear of the FDH. Pole mounted FDHs should further be configured so as to minimize the chances of having a linesman attach a safety lead to a structure not rated for stopping a fall.

SUMMARY OF THE INVENTION

A preferred embodiment of the present invention is directed to a fiber distribution hub enclosure in an optical fiber-to-the-premises network having a subscriber patch shelf in the enclosure that includes a plurality of termination connectors forming a termination field, and an optical splitter shelf in the enclosure having a plurality of optical splitter modules. The optical splitter modules have a plurality of splitter output pigtail ends wherein the pigtail ends are connectorized and administratively located directly on a splitter module bulkhead.

The preferred embodiments of the present invention include an optical splitter module having connectorized pigtails that are stored on a bulkhead faceplate of the module. The module includes an optical splitter output harness, for example, that consists of a ribbon cable assembly attached to the bulkhead with a rugged strain relief mechanism. The ribbon harness is converted to individual pigtails having connectors which are stored on adapter receptacles on the faceplate. Adapter receptacles used may optionally be half receptacles when storage is the only desired function or may be full receptacles when access to the pigtail ferrule tip is required. Access to the ferrule tip may be required for attaching fiber optic terminators to eliminate undesirable reflections caused by unterminated connectors. The module provides an administrative location for splitter outputs prior to being connected individually into service. The module also provides an administrative storage location for splitter outputs taken out of service as a temporary staging area before being reassigned and connected individually into service again.

Another aspect of the present invention includes a method for installing optical splitter modules and associated fixed length output pigtails, storing the connectorized ends of the pigtails in a position ready for deployment and then individually connecting the splitter outputs as required to connect service to subscriber terminations. Upon installing the splitter module the output pigtails are initially routed circumferentially around the subscriber termination field, connected in a storage position and slack from the pigtails is managed in the vertical channel. When a connect service order occurs, the process first verifies if there is an optical splitter output port available and if not adds splitter modules to the system. If splitter outputs are available the method includes disengaging pigtails from the storage position, connecting the splitter output pigtail to the subscriber termination, routing pigtail slack through a reduced circumferential path and storing slack in half-loops in the adjacent channel. If a subscriber is disconnected from service the splitter output is disengaged from the subscriber termination, routed through an expanded circumferential path and connected to the original storage receptacle at the splitter module.

Thus, preferred embodiments of the present invention include configuring a fiber distribution hub with optical splitter modules having fixed length connectorized pigtails. The preferred embodiments address positioning the optical splitter modules relative to other fiber terminations needing access to the optical splitter ports. Another aspect of the preferred embodiments include installing the pigtails in a configuration that requires minimum pigtail rearrangement and slack yet allowing for enough slack to reach any of the fiber terminations requiring access to splitter ports. Another aspect of the preferred embodiments includes optimally routing the pigtails to minimize and preferentially eliminate congestion and controlling slack within set limits of the enclosure. In a preferred embodiment, all pigtails have the same length for ease of manufacturing. Splitter modules, all having the same pigtail length, also allow ease of flexibility for allowing a splitter module to be installed in any available slot within a patch panel without regard to sequential order.

Preferred embodiments of the present invention also provide a method of fiber management in the enclosure such that congestion does not occur due to rearrangement and chum. The embodiment minimizes the slack and any chance of blocking access because of fiber entanglement. Further, the embodiment allows for chum over time including initial pigtail storage, service connection, service disconnection and repeat storage to provide ready access to pigtails for future use. The methods in accordance with the preferred embodiments, are non-blocking and non-congesting for jumpers routed into cable pathways and fiber patch panels. The methods of the preferred embodiment are fully contained within the confines of the enclosure.

An aspect of the present invention includes a communications network including a headend configured to select source material feeds of a local feed, a long distance feed, a broadcast feed, a central office operatively coupled to the headend via a communications trunk and a plurality of fiber distribution hubs operatively coupled to the network. The fiber distribution hubs include at least one termination shelf, at least one splitter shelf having a plurality of optical splitter modules and a channel for fiber management. The fiber distribution hub further includes a plurality of splitter output connectorized pigtail ends located on a bulkhead of at least one optical splitter module. The pigtail ends are located on adapter ports on the bulkhead. The optical splitter module further comprises a ribbon harness extending from the module.

In another aspect of the invention, a fiber distribution hub for use in an optical communications network is provided. The hub includes an enclosure housing a subscriber termination field consisting of numerous subscriber terminations. The distribution hub further includes an optical splitter shelf capable of holding one or more optical splitter modules. The splitter modules can include a splitter bulkhead, a plurality of receptacles and a plurality of pigtails. In addition, the distribution hub can include one or more routing channels for routing the pigtails circumferentially around at least a portion of the subscriber termination field.

Further aspects of the invention can employ a hinged chassis for housing splitter modules and/or subscriber termination fields. The hinged chassis facilitates access to rear portions of the splitter modules and termination fields. The hinged chassis can be used with conventional enclosures, enclosures having side panels pivotally mounted to the rear panel of the enclosure, or enclosures employing a pivotally mounted front portion and a fixed rear portion separated by a weather proof gasket. Still other aspects can employ an enclosure mounted to a utility pole and further having a structural member designed to receive fall restraint hardware. In addition, aspects of the invention can employ a pivotally mounted parking chassis for storing connectorized ends of pigtails when not connected to subscriber terminations.

The foregoing and other features and advantages of the systems and methods for fiber distribution and management will be apparent from the following more particular description of preferred embodiments of the system and method as illustrated in the accompanying drawings in which like reference characters refer to the same parts throughout the different views. The drawings are not necessarily to scale, emphasis instead being placed upon illustrating the principles of the invention.

BRIEF DESCRIPTION OF THE DRAWINGS

FIGS. 5A and 5B schematically illustrate the installation of the optical splitter module pigtails and the service connection configuration of the optical splitter module, respectively, in a network having modules adjacent to each other in accordance with a preferred embodiment of the present invention;

FIGS. 5C and 5D schematically illustrate the service connection configurations between adjacent fiber distribution hubs in accordance with alternate preferred embodiments of the present invention;

FIG. 6A illustrates an embodiment of a single width splitter module along with an embodiment of a double width module in accordance with an aspect of the invention;

FIG. 8 illustrates a view of the internal components of a fiber distribution hub enclosure in accordance with a preferred embodiment of the present invention;

DETAILED DESCRIPTION OF THE INVENTION

The preferred embodiments of the present invention are directed to an optical splitter module that is equipped with adapters for storing connectorized optical splitter pigtail ends. Adapters are administratively located on the optical splitter module bulkhead, for example, but not limited to, in octal count arrangements ideally suited to identify splitter ports having sixteen or thirty-two output ports. The adapters in accordance with preferred embodiments are used to store or stage the connectorized ends of the optical splitter for rapid location, identification, easy access and removal of pigtail output ends. In accordance with preferred embodiments, the optical splitter outputs extending from the bulkhead on the module are wrapped back and secured to adapters on the splitter bulkhead. The preferred embodiments also include methods for installing optical splitter modules and associated fixed length output pigtails, storing the connectorized ends of the pigtails in a position ready for deployment and then individually connecting the splitter outputs as required to connect service to subscriber terminations.

Figure 1:
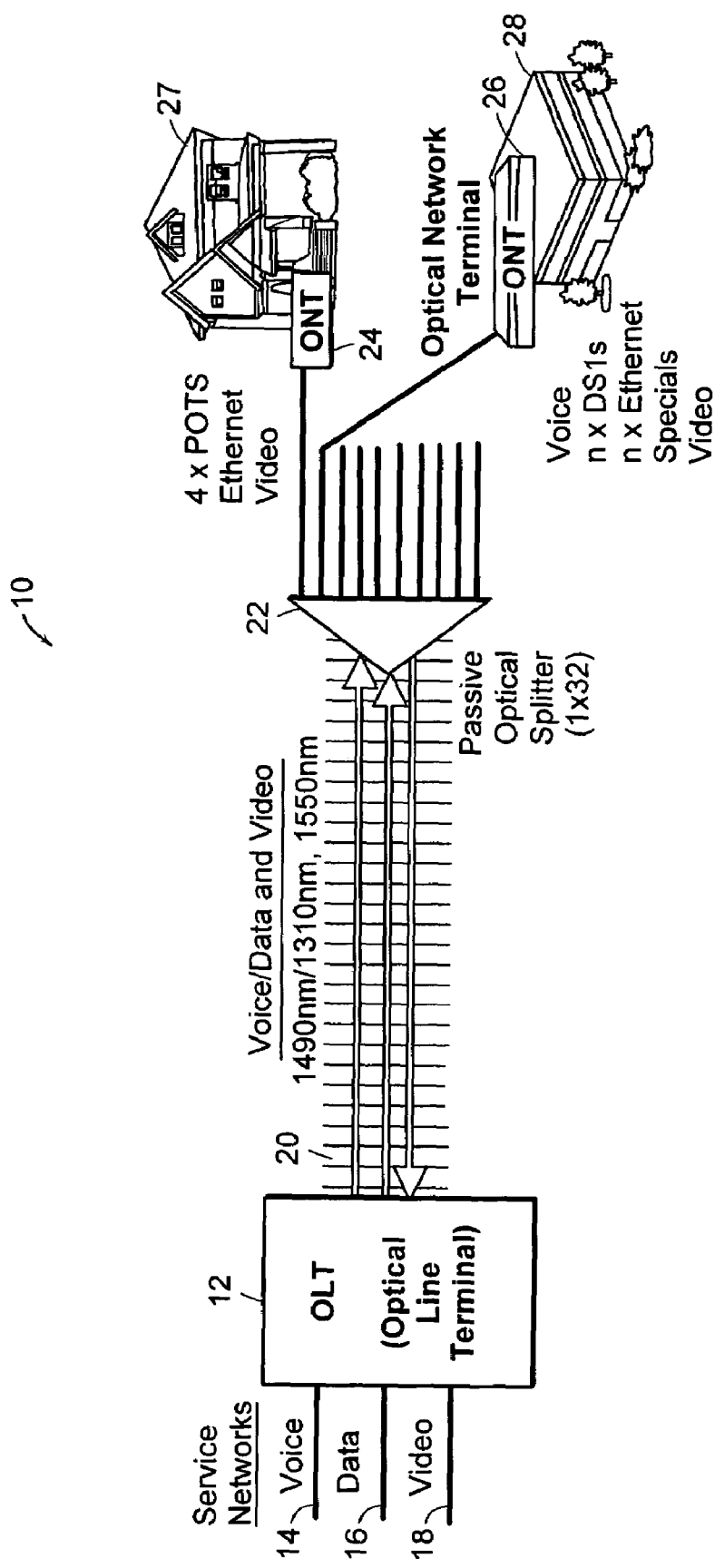
FIG. 1 illustrates schematically a broadband access network, for example, a fiber-to-the-premises (FTTP) network using passive optical network (PON) components in accordance with a preferred embodiment of the present invention.

FIG. 1 illustrates, schematically, a broadband access network 10, which for example, can be a Fiber-to-the-Premises (FTTP) network using passive optical network (PON) components in accordance with a preferred embodiment of the present invention.

FIG. 1 includes an optical line terminal (OLT) 12, a voice input 14 from a service network, a data input from 16 from a service network, a video input 18 from a service network, a wavelength division multiplexed fiber 20, a passive optical splitter 22, an optical network terminal (ONT) 24 and 26, a residence and an office building 28.

Network 10 employs OLT 12 which receives input data streams from service networks. By way of example, OLT 12 may receive voice input 14, data input 16 and video input 18. OLT 12 may then output a multiplexed data stream over one or more optical fibers 20. In an embodiment, OLT 12 may output voice at a wavelength on the order of 1490 nm, data at a wavelength on the order of 1310 nm and video at a wavelength on the order of 1550 nm. Optical fiber 20 may convey data using, for example, wavelength division multiplexing (WDM) to a passive optical splitter (POS) 22. POS 22 may receive data by way of a single fiber (the input fiber) and split the data across a plurality of output fibers. For example, POS 22 may split incoming data across 8, 16, 32, or more output fibers. In a preferred embodiment, each output fiber is associated with a respective end user such as a residential end user 27 or a commercial end user in office building 28. End user locations may employ optical network terminals (ONTs) 24, 26 for accepting multiplexed data and making it available to the end user. For example, ONT 24 may act as a demultiplexer by accepting a multiplexed data stream containing voice, video and data and demultiplexing the data stream to provide a separate voice channel to a user's telephone, a separate video channel to a television set and a separate data channel to a computer.

The architecture described in conjunction with FIG. 1 can be a point to multi-point PON construction, which utilizes, for example, 1:32 splitters at a fiber hub enclosure within a distribution area. The architecture can be fiber rich 1:1 distribution between the fiber hub and a customer's premise or the architecture can be diluted 1:X where X is an integer larger than 1. The broadband services capability of network 10 for distributing source information may include, for example, data signals (622 Mbps×155 Mbps (shared)), and video signals (860 MHz, ~600 analog and digital channels, high definition television (HDTV), and video on demand (VOD)). Source information may consist of data, such as, for example, voice or video that originates at a source such as a telecommunications service provider, hereinafter service provider. Signaling may be accomplished using wavelength division multiplexing (WDM) and fiber sharing. Network 10 can include optical network terminals 26 that are scalable, provide high bandwidth, multi-service applications that serve residences and small to medium sized businesses. Network 10 includes passive components that are located outside the plant, i.e. outside the service provider's building, and require minimal maintenance, since active components such as amplifiers are not required.

The broadband access network 10 includes digital subscriber plug-in line cards that have a broadband terminal adapter configured for receiving a digitally multiplexed broadband data stream and outputting a plurality of demultiplexed broadband data streams for the respective subscriber loops.

Figure 2:
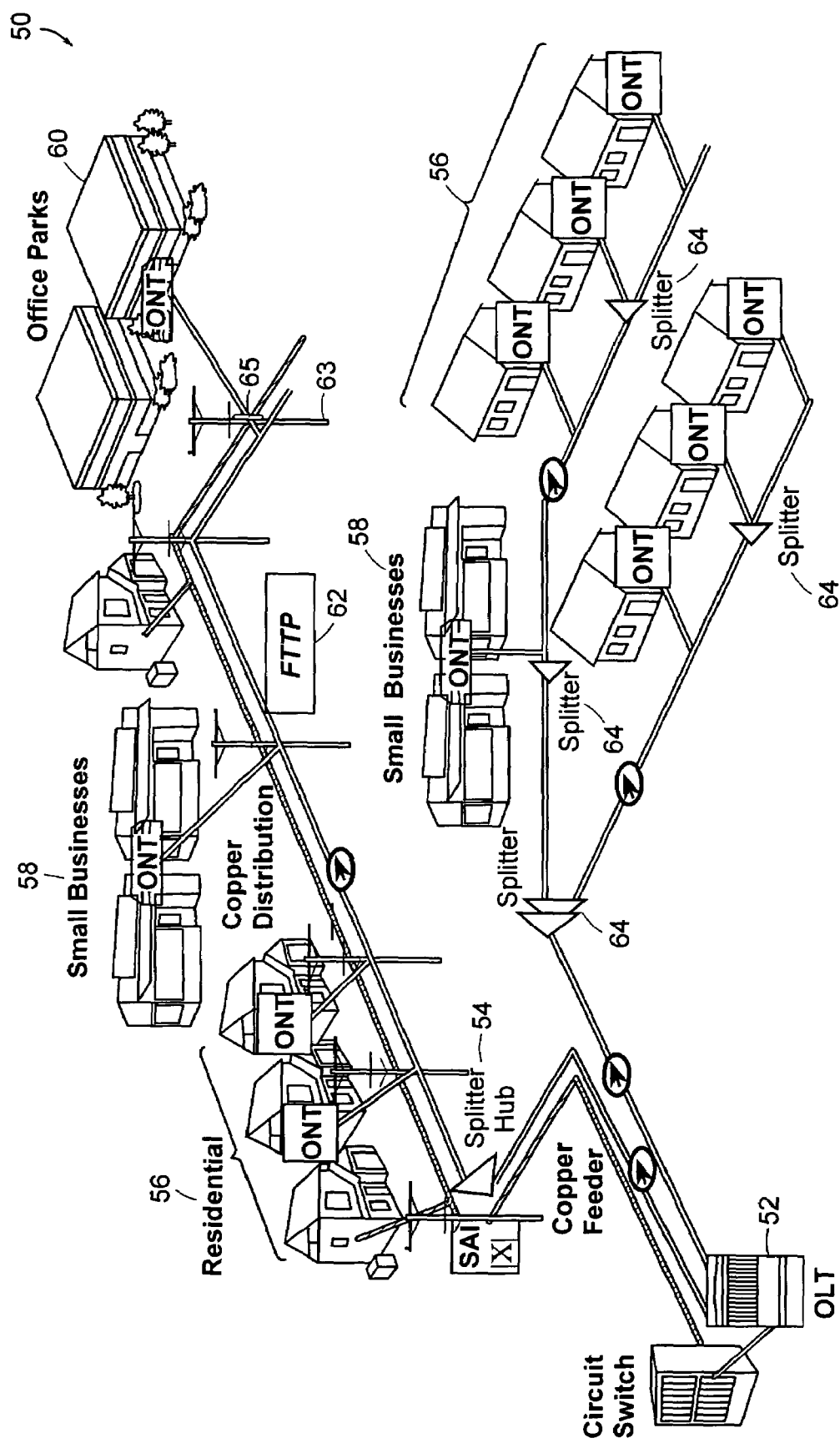
FIG. 2 illustrates schematically further details of an FTTP network in accordance with a preferred embodiment of the present invention.

FIG. 2 illustrates an alternative implementation of an optical broadband access network 50. Network 50 may include a circuit switch/OLT 52, an SAI, a splitter hub 54, residential ONTs 56, small business ONT 58, office park ONT 60, splitter 64, and fiber-to-the-premises (FTTP) 62. In Fiber-to-the-Premises broadband network applications optical splitters 64 are used to split the optical signals at various points in the network. In FTTP network 50 optical splitters are typically located in both indoor and outdoor environments including a Central Office/Head End, environmentally secure cabinets, enclosures or fiber drop terminals. In some outdoor applications, optical splitters have been deployed in tightly sealed environmental enclosures that are not easily re-enterable. Preferred embodiments include optical splitters incorporated in fiber distribution hubs 54 which are re-enterable outdoor enclosures. These enclosures allow easy re-entry by linesmen or other service personnel for access to optical splitters 64 allowing splitter ports to be utilized effectively and for additional splitter ports to be added on an incremental basis.

Preferred embodiments of the present invention may receive data from optical splitters that are provided prepackaged in optical splitter module housings that are mounted in a fiber patch panel to facilitate routing of jumpers interconnected from fibers in adjacent subscriber ports to the splitter outputs. This optical splitter module, or cassette, provides protective packaging and thus easy handling for otherwise fragile splitter components. The optical splitter modules can be added incrementally to the patch panel.

FTTP broadband networks are designed to achieve low optical insertion loss in order to achieve maximum network reach from electronics having fixed power output. Each optical component and subsystem utilized in the network is optimized to provide minimum insertion loss. The optical loss budget in a preferred embodiment is approximately 23 to 25 dB with 1:32 passive splitting. The components and factors contributing to the optical loss include splitters (1:32, single or cascaded), WDMs, connectors (optical line terminal (OLT), FDF, splitters, drop, ONT), fiber attenuation (at least three wavelengths: 1310 nm, 1490 nm, 1550 nm), and splicing.

Splitter hub 54 may serve on the order of 128 splitter ports/premises. It includes multiple distribution cables, connectorized or fusion spliced between splitter and distribution hub 54. The splitter hubs used in conjunction with preferred embodiments are pole or ground mountable. The drop terminals can be with or without splitters and include various number of drops, both aerial and buried.

Splitters 64 may be deployed by way of splitter hub 54 or they may be deployed in smaller enclosures. A fiber drop terminal 65 is often used in conjunction with a utility pole 63 (FIG. 2). Utility pole 63 may be used to support conventional copper wire strands such as those used for plain old telephone service (POTS) and those used for cable television (CATV). For example, POTS strands may consists of a plurality of twisted pairs and CATV may consist of coaxial cables. Utility pole 63 may also support optical fiber bundles such as those used for delivering FTTP services. A fiber drop terminal 65 may be attached to utility pole 63 and communicatively coupled with one-or-more of the optical fibers contained in a strand. Fiber drop terminal 65 may be spliced to optical fibers using techniques known in the art. For example, fiber drop terminal 65 may be spliced to an optical fiber at a manufacturing or assembly plant at a predetermined location on a strand, or fiber drop terminal 65 may be spliced to an optical fiber in the field by a linesman, or other crafts person, at a determined location.

Fiber drop terminals are used to interface between distribution cables and drop cables in a Passive Optic Network (PON) application. The fiber drop terminal 65 typically is installed by splicing a multi-fiber cable at a branch point in a large fiber count distribution cable. Fiber drop terminals may typically consist of 4, 6, 8 or 12 fibers and in some instances even more fibers. A single cable is used as the input to the terminal containing the fibers with the aforementioned counts. By way of example, a feed cable may have a central tube housing a plurality of individual optical fibers. Inside fiber drop terminal 65 the multi-fiber feed cable is separated into individual fibers and then terminated on individual rugged outdoor connector/adapters located on the exterior surface of the enclosure. Fiber drop terminal 65 is thus used to stage the PON cabling system near premises locations, such as a residence or office building, so that when a subscriber requests service a simple connectorized drop cable can be quickly connected between the fiber drop terminal and the Optical Network Terminal (ONT) at the home.

In preferred embodiments, optical connectors are used in the network to provide the desired flexibility however they are restricted to those points in the network where flexibility is absolutely required. Optical connectors are required to provide flexible access to optical splitter outputs. The preferred embodiments of the present invention provide connector flexibility and yet minimize optical loss using the optical splitter module with connectorized pigtails. The pigtails have standard SC or LC type connectors on the ends.

Figure 3A:
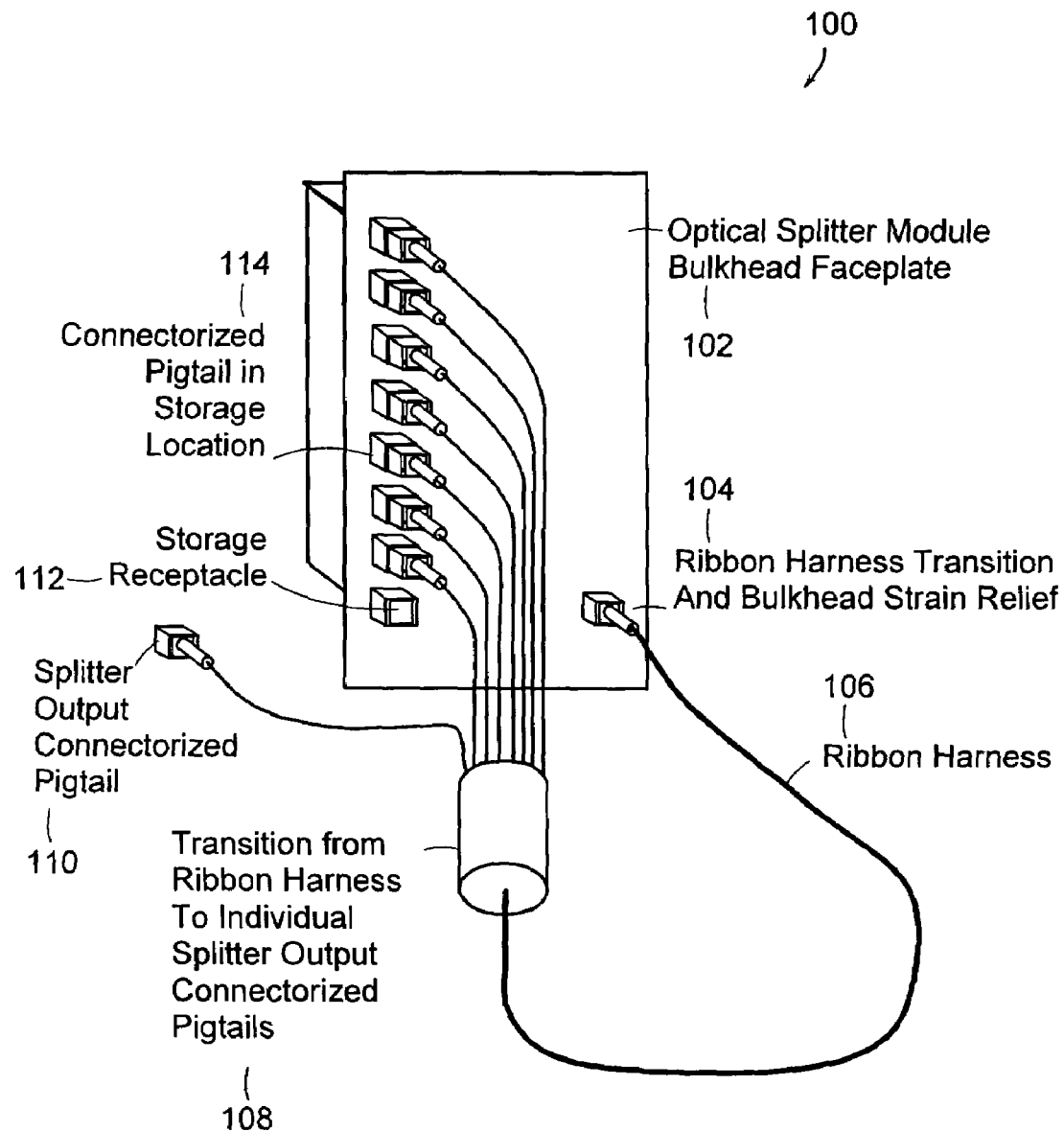
FIG. 3A illustrates an optical splitter module in a fiber distribution network having connectorized pigtails in accordance with a preferred embodiment of the present invention.

FIG. 3A illustrates an optical splitter module 100 in a fiber distribution network having connectorized pigtails in accordance with a preferred embodiment of the present invention. Module 100 may include essentially any number of output pigtails; however, typical deployments will utilize either 16 or 32 outputs per splitter module. The module 100 includes a bulkhead faceplate 102 having storage receptacles 112. In a preferred embodiment, the optical splitter module 100 provides for a high density ribbon cabling harness 106 to protect the splitter outputs extending from the splitter module. The optical splitter module ribbon harness 106 is secured to module 100 with a strain relief mechanism 104 to provide high pull strength and bend radius control. The compact nature of the ribbon harness 106 allows for higher packing density and better space utilization in the cabling trough. The module harness is converted to individual pigtails with connectors to allow splitter outputs to be administered and rearranged individually.

Module 100 may be equipped with either half non-functional adapters or full functioning adapters as a means for storing pigtail ends. In preferred embodiment, the half non-functional adapters are used in applications not requiring fiber optic terminators other than for storage functionality. The full functional adapters are used in applications requiring connection of fiber optic terminators to the optical splitter output port. Access to the pigtail ferrule tip may be required for attaching fiber optic terminators to eliminate undesirable reflections caused by unterminated connectors. The module provides a home position from which optical splitter output pigtails can be deployed and where they can be returned to once taken out of service. This administrative use of adapters provides protection for the connectorized pigtails ends, maintains cleanliness of the connector ends, and enables rapid service connection and deployment.

The preferred embodiments of the present invention address configuring a fiber distribution hub with optical splitter modules having fixed length connectorized pigtails. One aspect of the preferred embodiment determines where to position the optical splitter modules relative to other fiber terminations needing access to the optical splitter ports. The preferred embodiments also provide for installing pigtails in a configuration that requires minimal pigtail rearrangement and slack yet allowing for enough slack to reach any of the fiber terminations requiring access to splitter ports. The methods of installing optical splitter module pigtails include determining how to route the pigtails in order to provide an optimal routing scheme that does not get congested and wherein slack can be controlled within set limits of the enclosure. The methods in accordance with a preferred embodiment of the present invention include making all pigtails the same length for ease of manufacturing and ordering by the customer. Splitter modules all having the same pigtail length also allow ease of flexibility for allowing a splitter module to be installed in any available slot within the patch panel without regard to sequential order. While fixed length pigtails are preferred for many implantations, embodiments are not limited thereto. If desired, variable length pigtails may also be used.

A preferred embodiment of the method for installing the splitter module pigtails also provides for fiber management in the enclosure so that rearrangement and churn does not congest this management. To accomplish this, the slack and any chance of blocking access because of fiber entanglement is minimized. Preferred embodiments allow for churn over time including initial pigtail storage, service connection, service disconnection and repeat storage to provide ready access to pigtails for future use. The methods of the present invention are non-blocking and non-congesting for jumpers routed into cable pathways and fiber patch panels. The method of a preferred embodiment is fully contained within the confines of the enclosure.

Figure 3B:
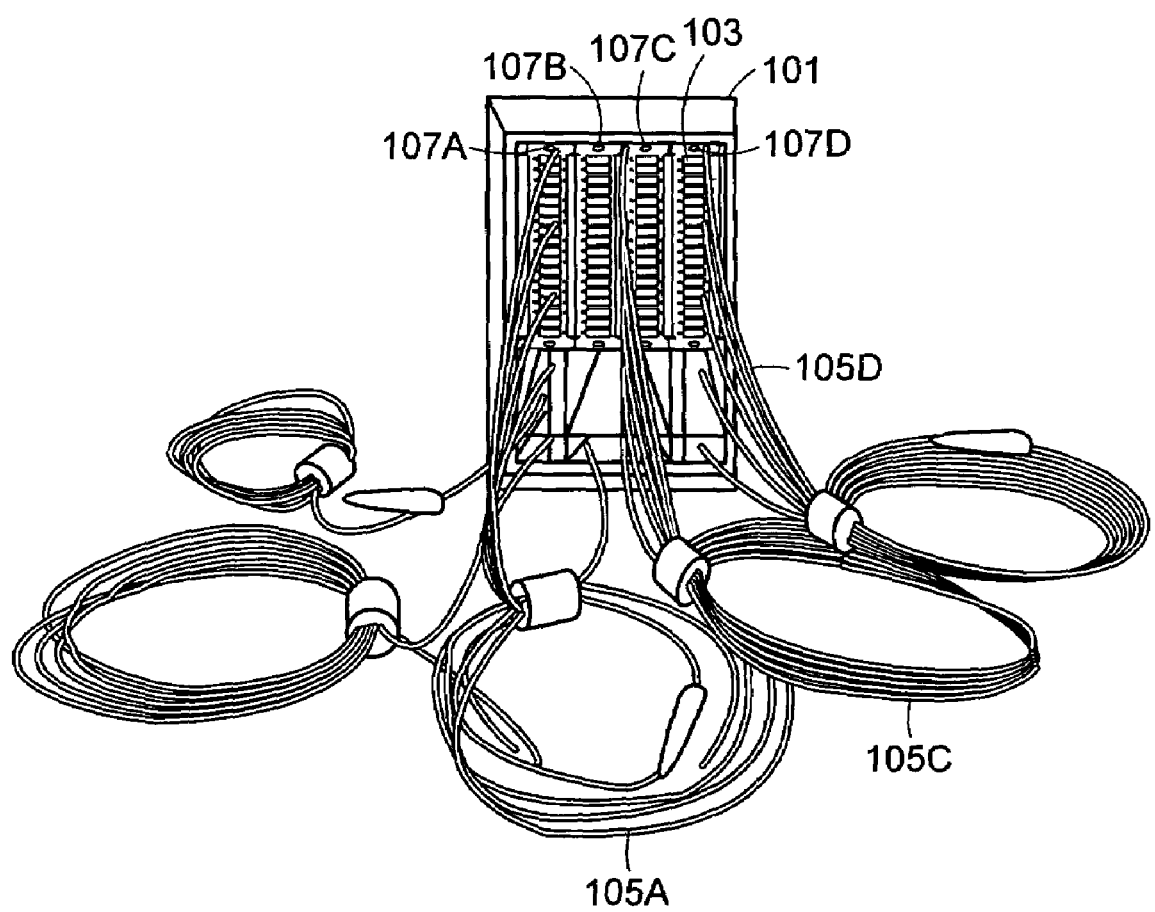
FIG. 3B illustrates an exemplary embodiment of an optical component module in accordance with a preferred embodiment of the invention.

FIG. 3B illustrates a view of the optical component modules (OCM) 107A–D in module chassis frame 101 a fiber distribution hub enclosure in accordance with a preferred embodiment of the present invention. The FDH configuration in a preferred embodiment provides for fiber management hardware on one side of the cabinet. This allows fiber jumpers to be routed between the termination shelf and the splitter shelf. Excess slack can be managed on the side of the cabinet using slack loops.

In accordance with a preferred embodiment, OCM modules 107A–D can also be equipped with pigtails 105 to reduce the number of connections in the network. The modules shown in FIG. 3B each contain a 1×32 splitter with pigtails provided on the input and 32 outputs. The connectorized ends of the pigtails are stored on bulkhead adapters 103 on the front of the module. These storage adapters provide a familiar locating scheme for spare pigtails so that connector ends can be quickly identified and connected to distribution fibers. The spacing on the adapters is the same as on standard connector panels.

In preferred embodiments, OCM modules can also be equipped with standard terminators. Modules terminated with bulkhead adapters may be equipped with terminators on the front of the module. Modules connected via pigtails and equipped with storage adapters are equipped with terminators on the rear of the panel.

Figure 4A:
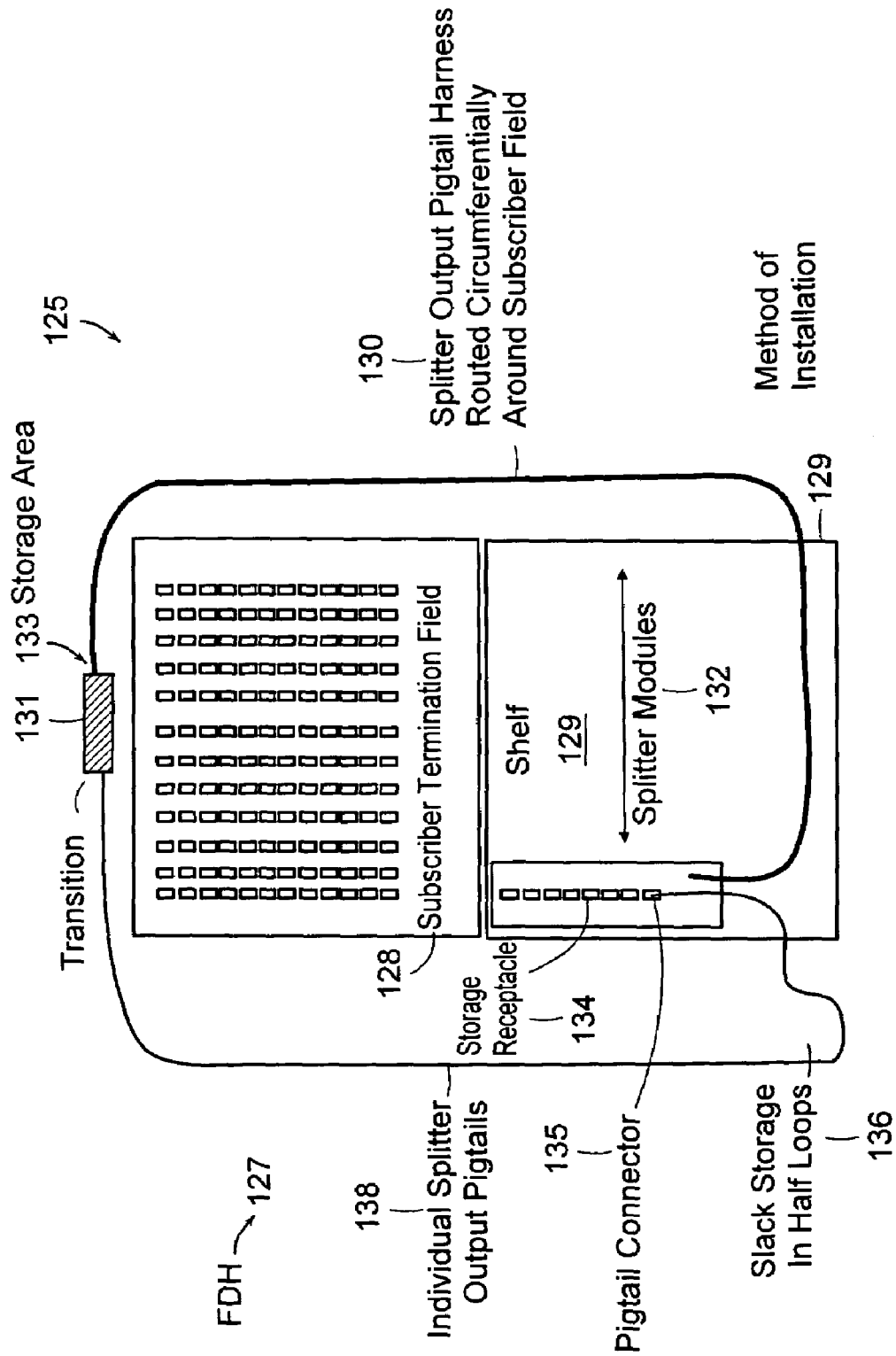
FIG. 4A schematically illustrates the installation of the optical splitter module pigtails in accordance with a preferred embodiment of the present invention.

FIG. 4A schematically illustrates the installation of the optical splitter module pigtails 138 in accordance with a preferred embodiment of the present invention. A preferred embodiment of the present invention includes a cabling installation layout 125 for FDH 127 including splitter modules 132 incrementally installed on a shelf 129 adjacent to a subscriber termination field 128. The connectorized pigtails 138 from the splitter modules 132 having fixed identical length are routed in a circumferential path 130 surrounding the subscriber termination field 128. The connectorized ends of the pigtails 138 are stored at a position on the front of the splitter module 132 using storage receptacles 134. The layout in accordance with a preferred embodiment employs a fan through placement so that the splitter module pigtails can be installed without disturbing installation of pigtails already connected to subscriber termination field 128. This installation layout in accordance with a preferred method of the present invention also ensures that the splitter module 132 can be preconfigured with the pigtail connectors 135 in the storage position and left in the storage position throughout the pigtail installation process.

Figure 4B:
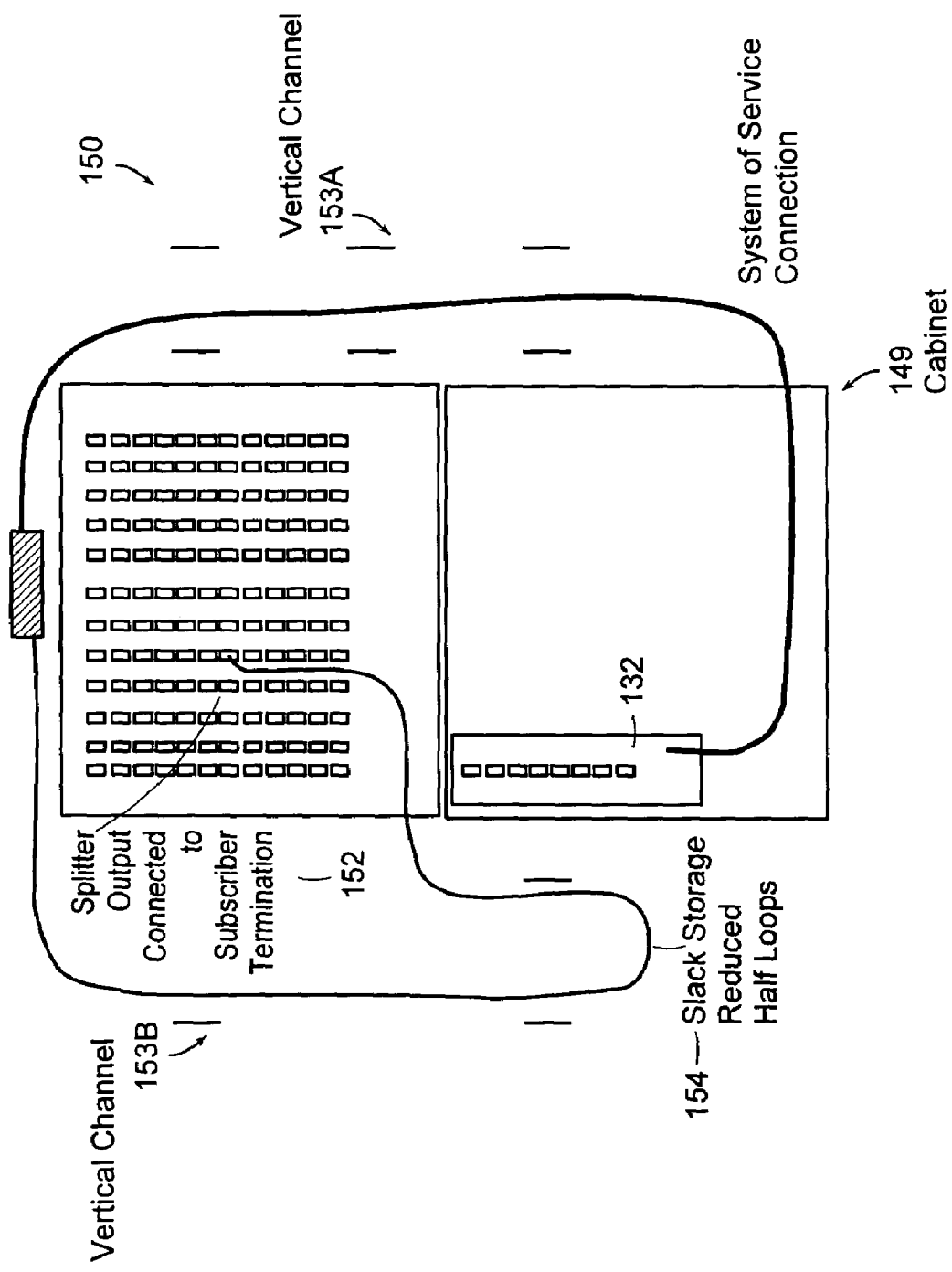
FIG. 4B schematically illustrates the service connection configuration of the optical splitter module in accordance with a preferred embodiment of the present invention.

FIG. 4B schematically illustrates the service connection configuration 150 of the optical splitter module in accordance with the preferred embodiment of the present invention shown in FIG. 4A. The preferred embodiments of the present invention, include a service connection method to connect a subscriber into service by first disconnecting an individual splitter output pigtail 138 from the storage position in splitter module 132 and then routing the pigtail to the desired subscriber port 152. Since the pigtail harness has been preconfigured and routed circumferentially around the subscriber termination, the pigtail 138 inherently reaches any of the desired subscriber ports within the target population by simply reducing the circumferential path distance. By reducing the circumferential path the pigtail slack exhibits additional slack. The additional slack may be taken up using slack-half loops in the vertical channel 153A, B, or pigtail channel, where the pigtails are routed. The random nature of connecting splitter output pigtails to subscriber ports 152 result in a family of various size half-loops 154 that are managed in the vertical channel 153A and 153B within the confines of cabinet 149.

Figure 5A:
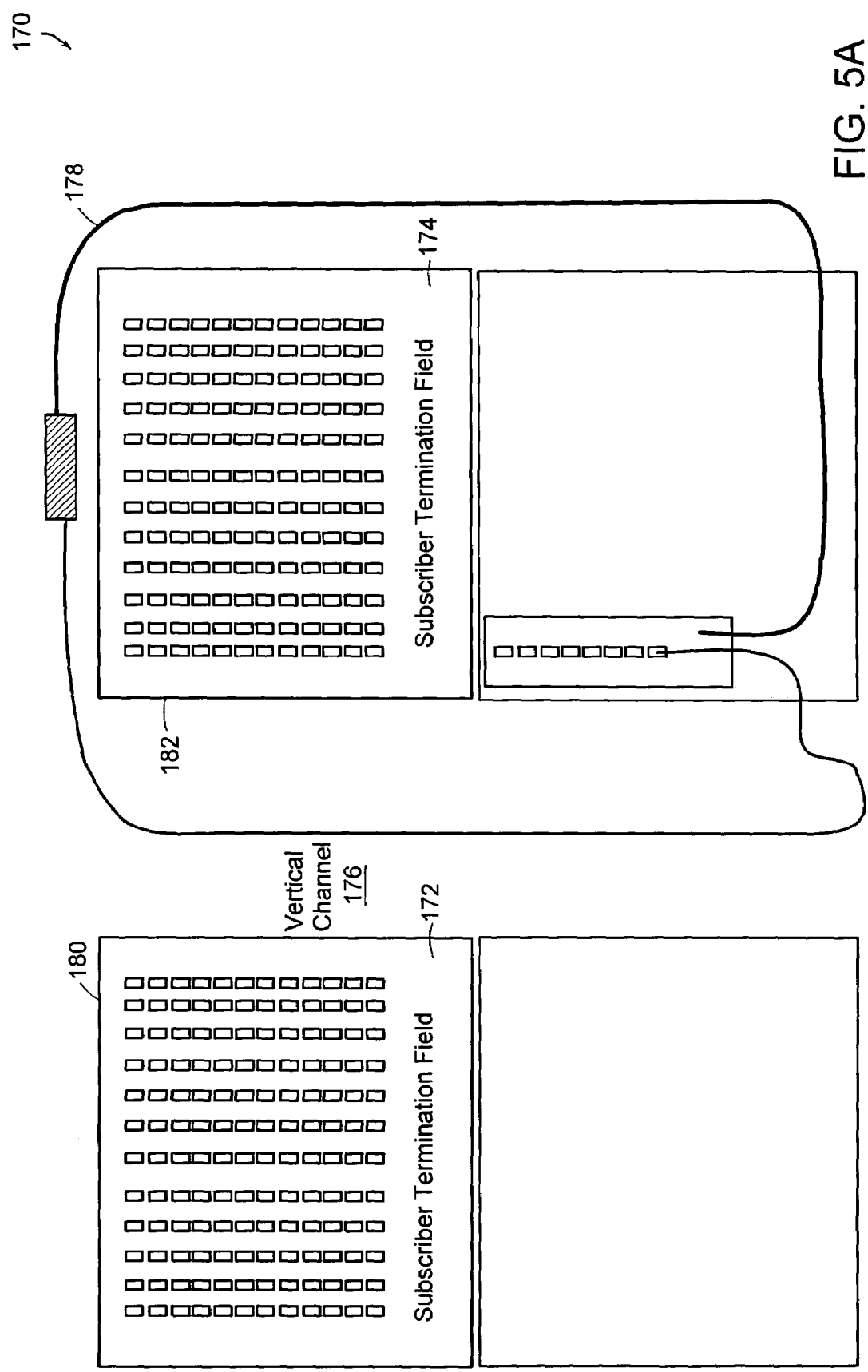

FIGS. 5A and 5B schematically illustrate the installation of the optical splitter module 132 pigtails and the service connection configuration of the optical splitter module, respectively, in a network having modules adjacent to each other in accordance with a preferred embodiment of the present invention. A preferred embodiment of the present invention includes a method to connect subscriber ports that are in an adjacent field but not initially contained within the circumference of the splitter pigtail harness. In this extension the splitter output pigtail is routed to the adjacent field 180 which by virtue of a juxtaposed position has a path at the same distance to the subscriber port within the circumference. The subscriber ports 192 in the adjacent field also are assigned randomly therefore the resultant slack is managed using a family of various size half-loops in the vertical channel 176.

Figure 5D:
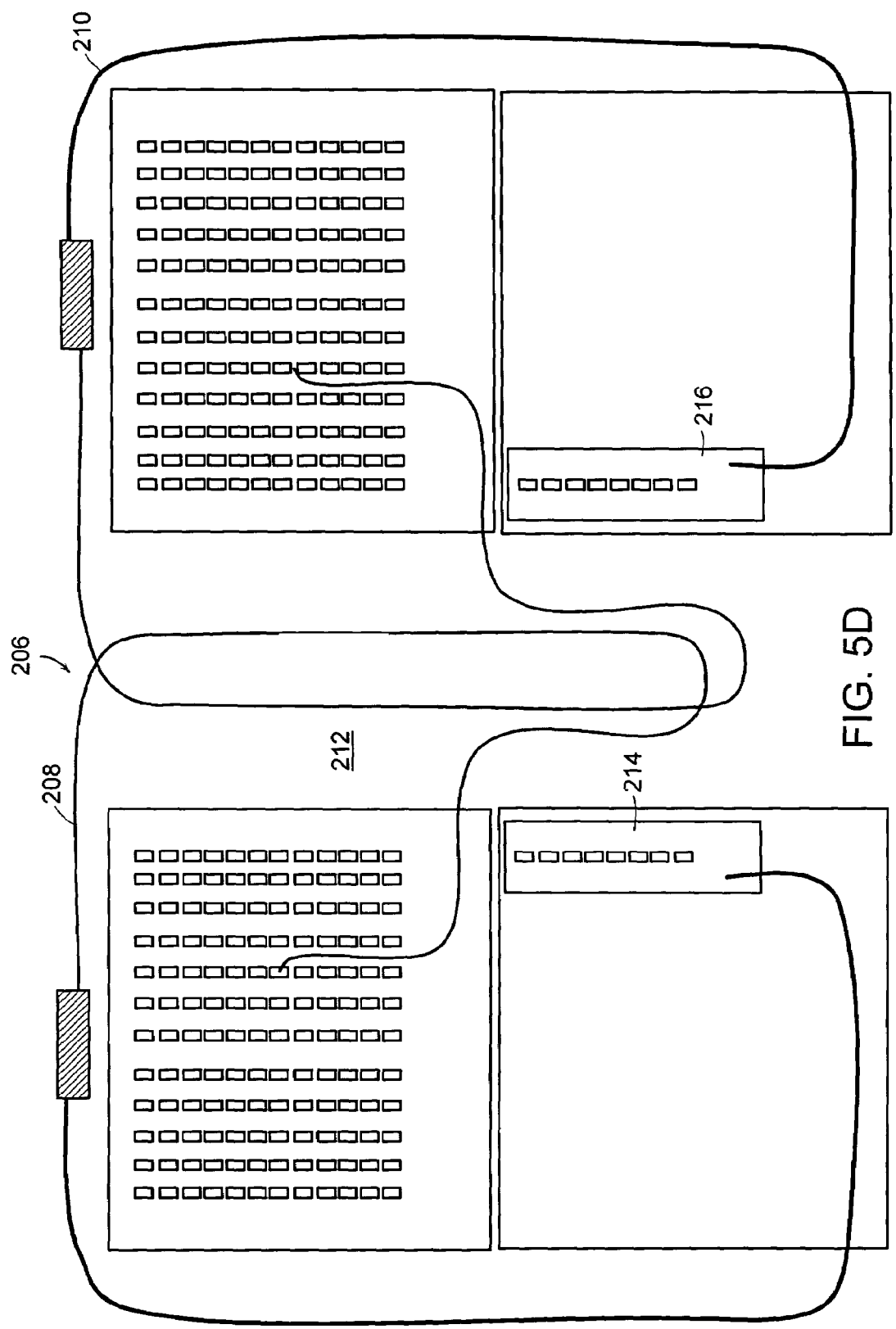

FIGS. 5C and 5D schematically illustrate the service connection configurations 194, 206 of the termination and splitter fields in adjacent fiber distribution hubs in accordance with a preferred embodiment of the present invention. The pigtails 198, 208 of the left module 196, 214 are routed circumferentially clockwise while the right pigtails 204, 210 of the module 202, 216 are routed circumferentially counterclockwise in a preferred embodiment. The fiber distribution hubs in this embodiment are located adjacent to one another, each having a splitter shelf with splitter modules and a termination shelf. The counter rotating feed provides for routing of the splitter module output pigtails circumferentially around the subscriber termination fields. The pigtail slack is stored in the vertical channels 200, 212.

A preferred embodiment includes a method of removing a splitter pigtail from a subscriber port and either redeploying that output pigtail to a new subscriber or storing the pigtail back to the original storage position at the splitter module. The method is completely non-blocking and non-congesting due to the planned slack management.

Most embodiments of optical splitter modules 132 used in FDH 127 may have 16 output ports or 32 output ports depending on a particular network configuration which 20 may include considerations for an optical budget associated with the optical splitters and associated network reach. FIG. 6A illustrates a single width module 222 having a width (W1) 230 along with a double width module 224 having a width (W2) 232 that is on the order of twice that of WI 224. Optical splitter modules 222, 224 may have a physical configuration where output ports are terminated on the bulkhead faceplate 227, 229 using connectors and/or receptacles 228, 238, 240, or alternatively, with output ports in the form of pigtails 138 extending from the bulkhead faceplate and wrapped back and staged on storage ports 226, 234, 236 located on the faceplate as shown in, for example, FIG. 4A. In at least one design implementation, a 16 port module 222 may be deployed as a single width module W1 230 having output ports or storage ports arranged in a single column 226 of sixteen on the faceplate 227. And, according to the same design implementation, a 32 port module 224 is a double width W2 232 module having output ports or storage ports arranged in two columns 234, 236 of sixteen each on the faceplate 229.

When used with pigtails and storage ports, the extending multi-fiber pigtail harness and associated breakout to individual pigtails consumes space in the enclosure for storing the protective breakout device that converts from multi-fiber cables to individual fiber pigtails. The space for storing the breakout device, or transition, 131 (FIG. 4A) is designed to allow either breakouts from two sixteen output port modules 222 or one thirty-two output port module 224. Furthermore the space for storing the breakout device may be located at a fixed distance along a circumferentially routed splitter output harness. Therefore the space in the chassis allocated for mounting splitter modules that corresponds to the fixed storage space for the breakout devices should allow only two sixteen output port splitter modules 222 or one thirty-two output port splitter module 224 to be installed.

In certain situations, it may be desirable to employ a configuration utilizing an installation sequence wherein a 16 port module 222 is installed interstitially between two 32 port modules 224 with no space between adjacent modules. Such a configuration can pose problems if inadequate space is provided for accommodating the transition 131. Examples of problems can include blocking and congestion. A pair-wise installation of a single width module 222 (e.g. a 16 output port module) in a double width slot can be utilized to preserve correspondence of equal length cabling harness breakout devices 131 which are stored and secured remotely from a splitter module in a designated storage area 133 of the enclosure 127.

Embodiments of the invention make use of structures and methods that alone, or in combination, dissuade a user from installing a 32 port double width module 224 immediately adjacent to a 16 port single width module in situations where single width 16 port modules have not been installed in pairs, i.e. two 16 port modules installed immediately side-by-side. Techniques utilized in preferred embodiments, employ an automatically indexed latch to substantially preserve pair-wise installation of single width 16 port modules in the same position as a dual width 32 port modules.

Figure 6B:
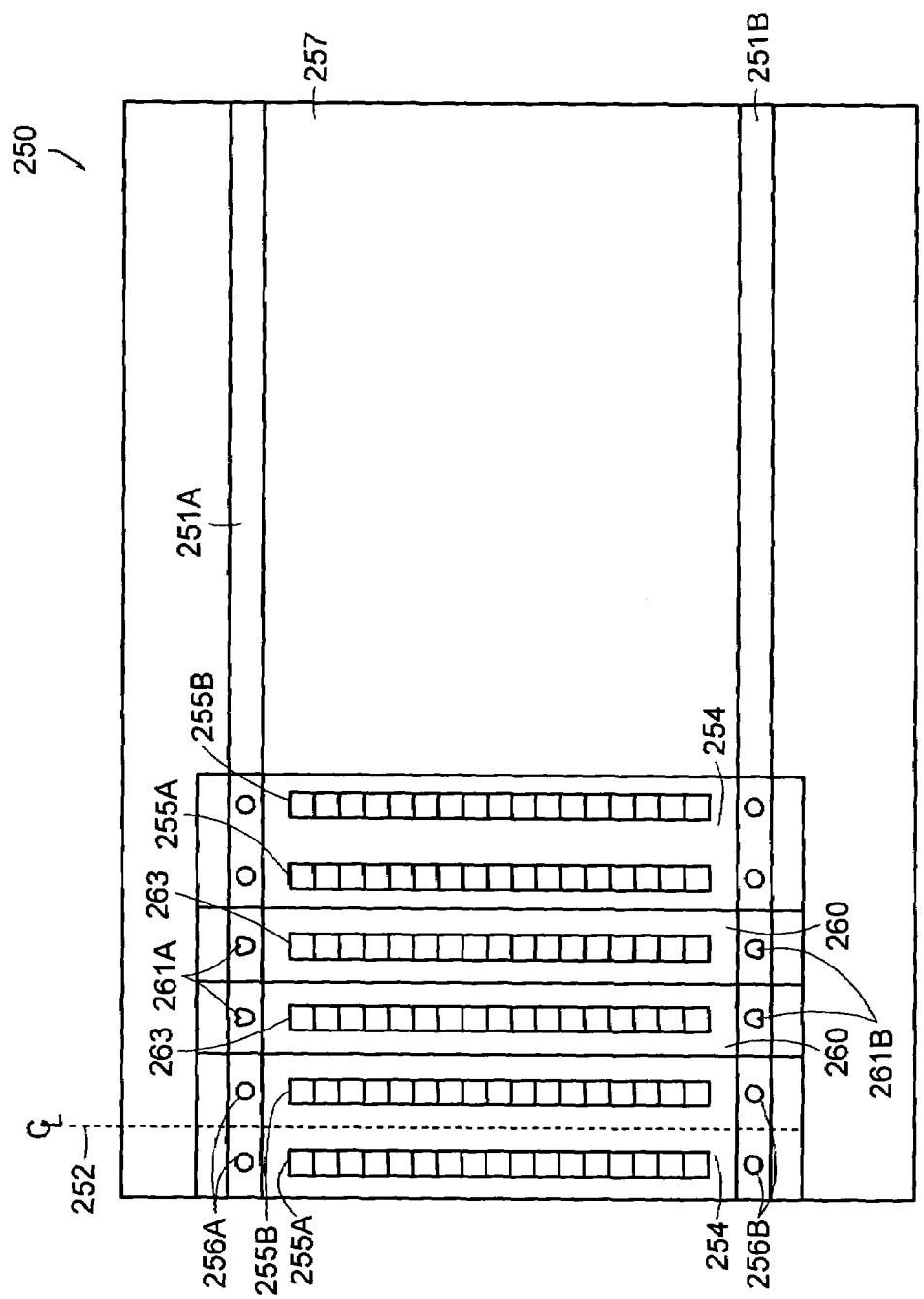
FIGS. 6B–6H illustrate exemplary splitter module arrangements in accordance with an aspect of the invention.
Figure 6C:
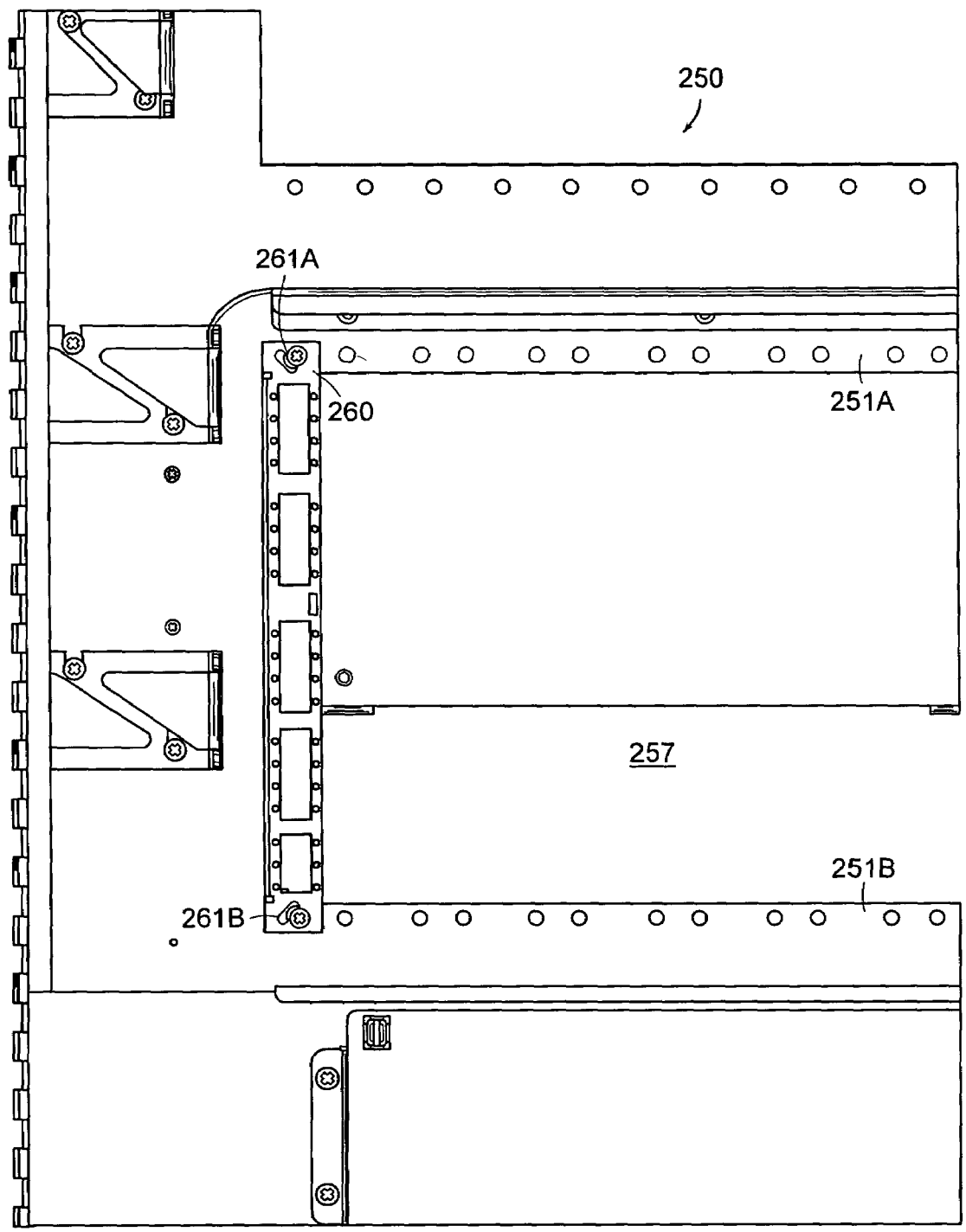
Figure 6D:
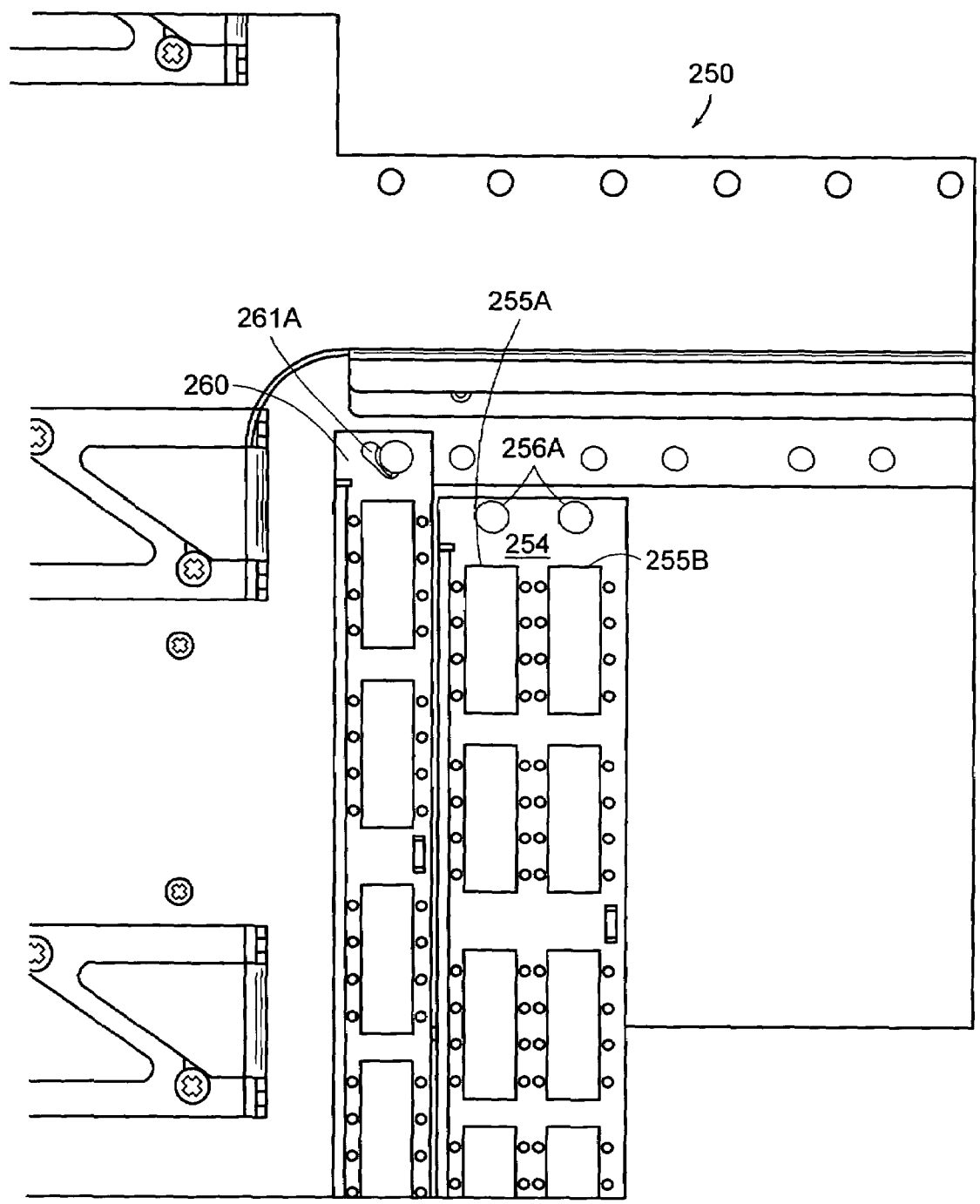
Figure 6E:
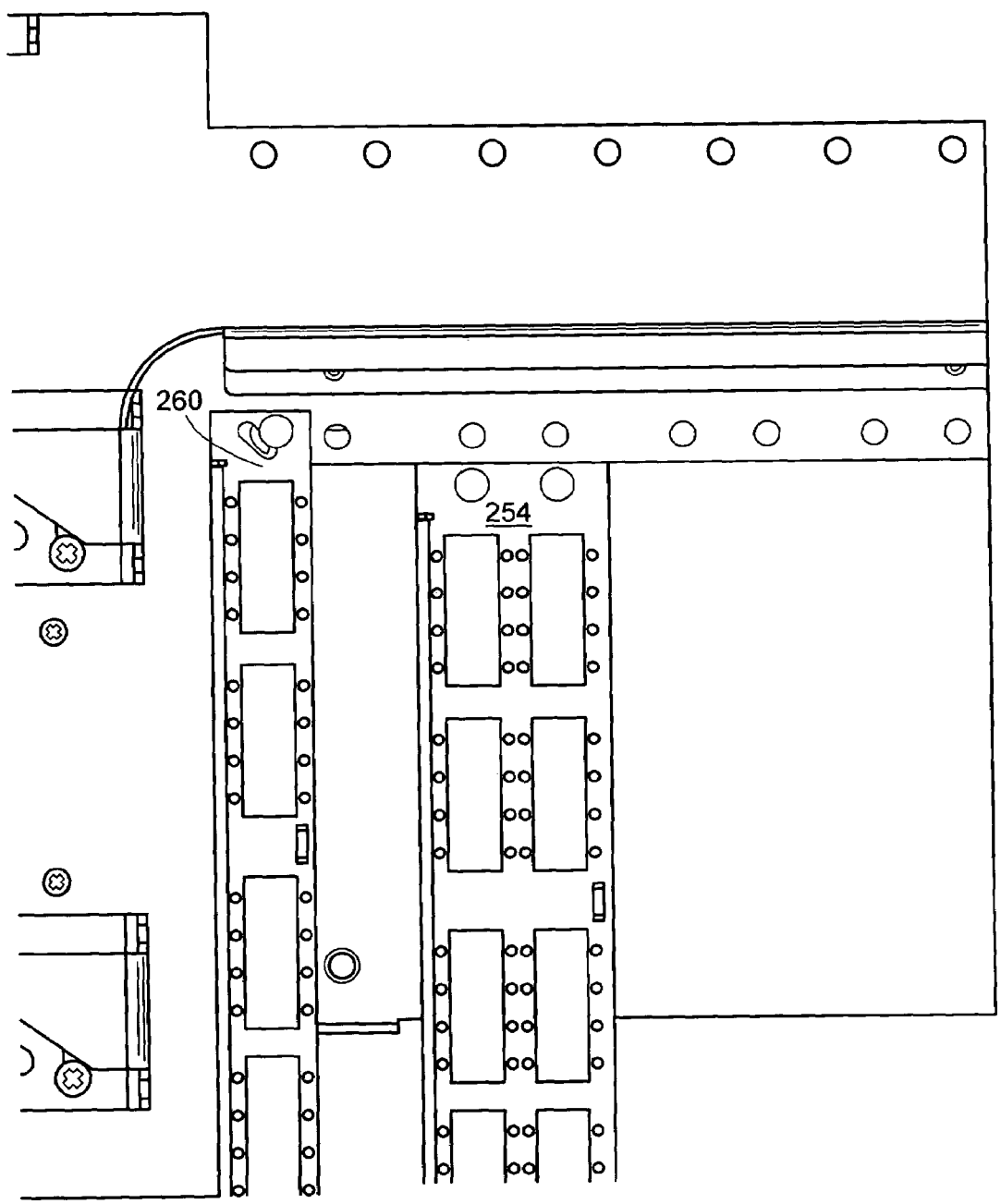
Figure 6F:
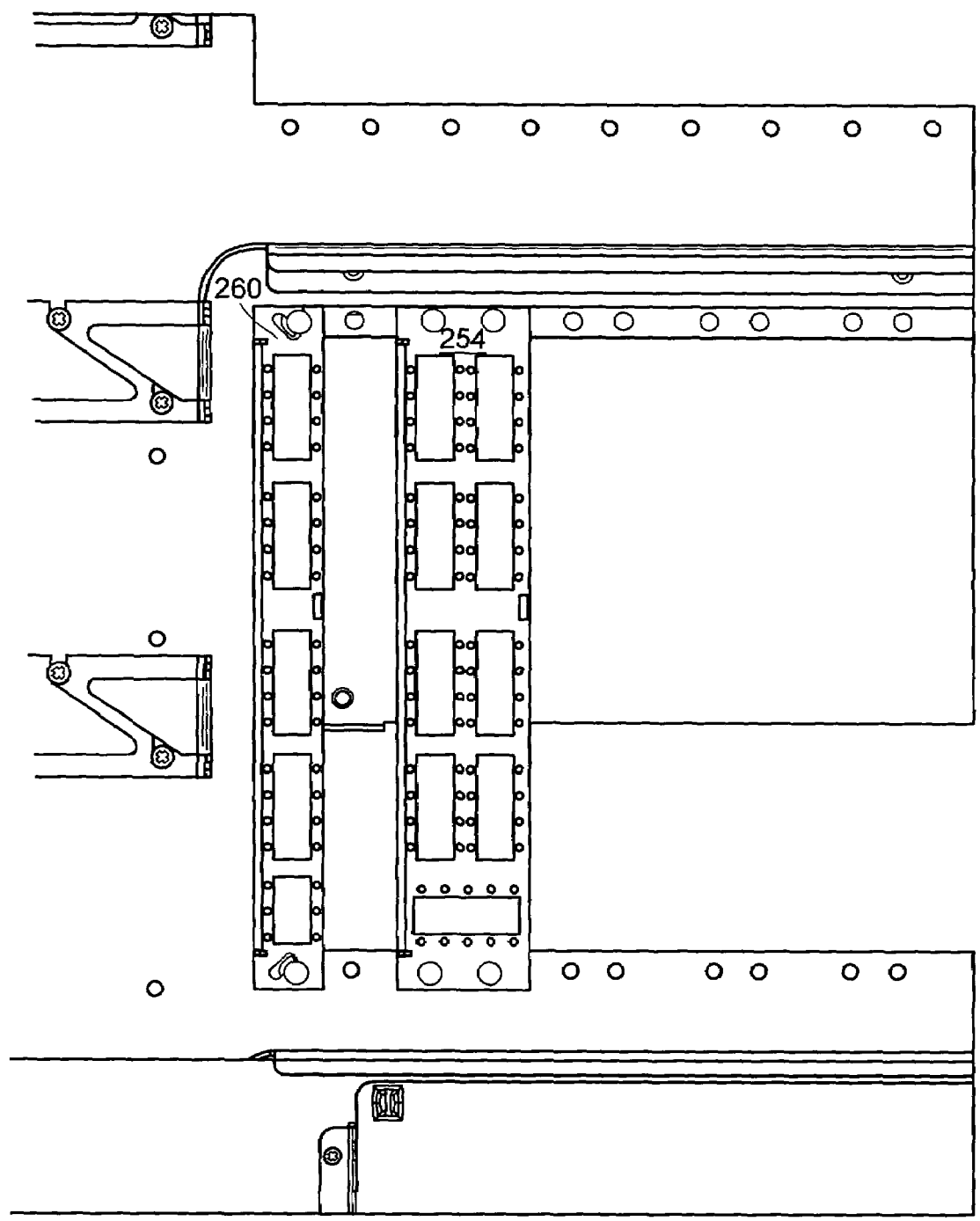
Figure 6G:
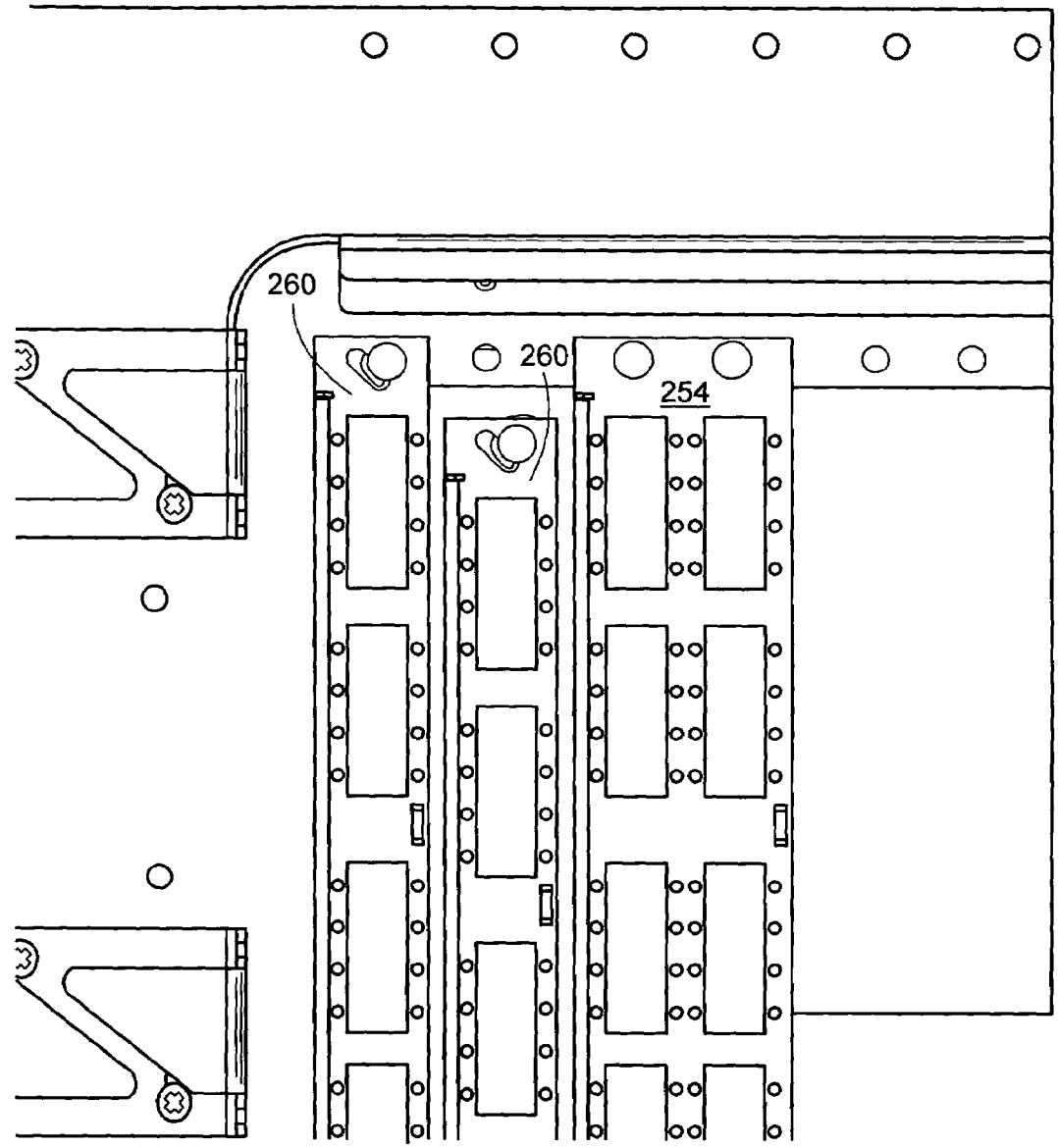
Figure 6H:
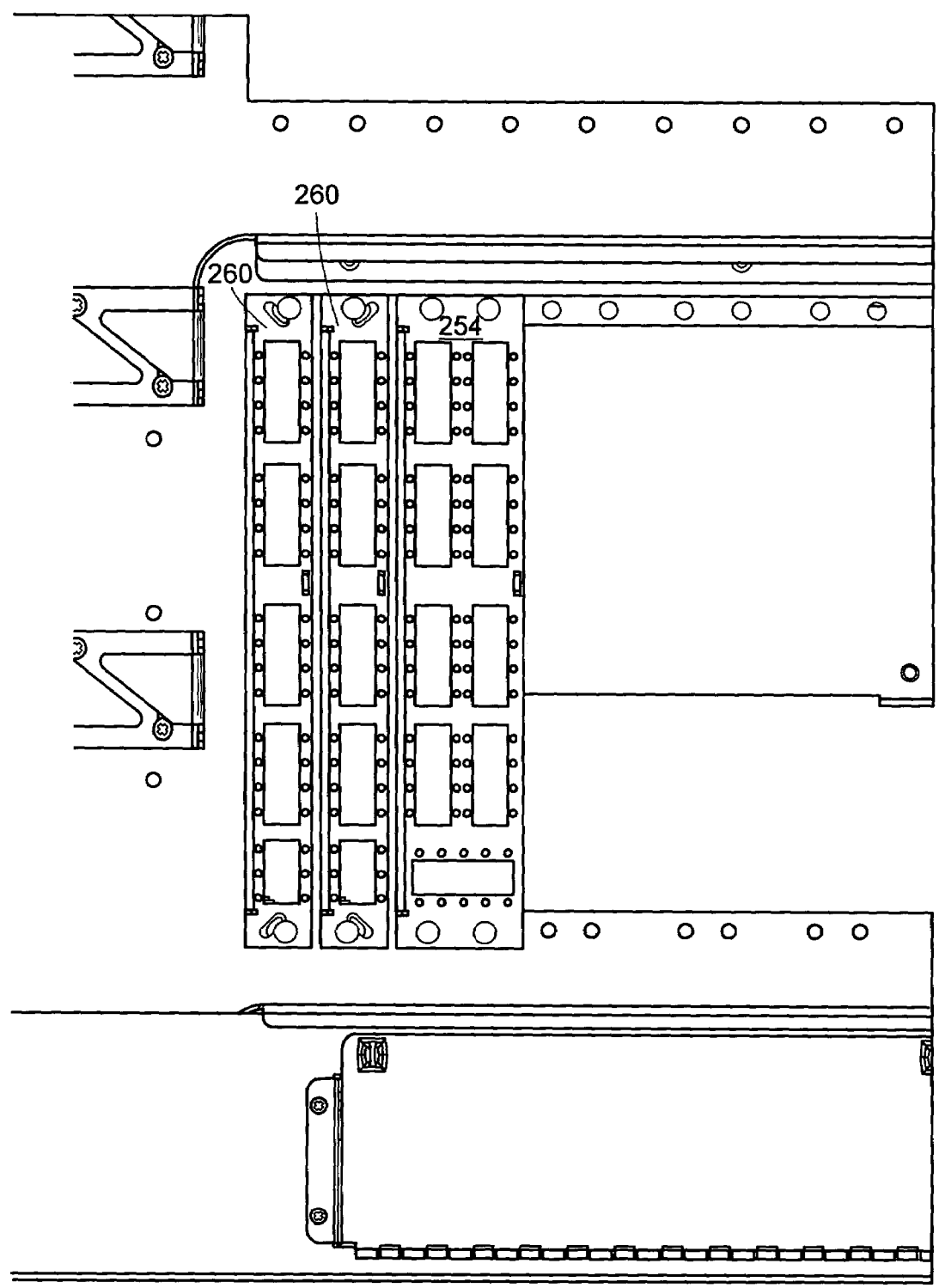

FIG. 6B illustrates an embodiment utilizing a unique chassis bulkhead mounting configuration for splitter modules and a unique latch configuration associated with the splitter module to ensure that two single-width sixteen port splitter modules 260 are installed in a pair wise arrangement into the same space that would otherwise accept a single width thirty-two port splitter module 254.

FIG. 6B includes a bulkhead 250 having an upper mounting rail 251A and a lower rail 25 1B defining an opening 257 for receiving double width splitter modules 254 and single width splitter modules 260. Double width modules 254 include upper mounting hole pair 256A, lower mounting hole pair 256B on a faceplate along with a first bank of receptacles 255A and a second bank of receptacles 255B. Single width modules 260 include an upper mounting hole 261A and a lower mounting hole 261B and a single bank of receptacles 263. In addition, single width modules 260, and/or double width mounting modules 254 may include mounting latches.

A FDH chassis is supplied with a bulkhead 250 that provides an opening 257 for receiving splitter modules 254, 258 in combination with mounting holes that receive splitter module latches immediately above and below the opening in the bulkhead. The pattern for the module mounting holes on the bulkhead of the FDH chassis consists of four holes per double wide module 254 which is divided into two holes on top 256A and two holes on the bottom 256B of the opening. The configuration is uniquely arranged such that each set of holes is offset toward the center so that they are not spaced evenly in the center where normally they would be expected when mounting single-width 16 port modules 260 into the same space. This unique bulkhead mounting arrangement ensures that a double width module 254 cannot be installed immediately adjacent to a single width module 260 unless two single width modules 260 have been installed in a pair wise arrangement. By ensuring a pair wise installation this in turn forces the proper utilization of the storage area for splitter output pigtail breakout devices on the FDH chassis which are located remotely from the splitter modules at a fixed distance from the splitter module along the circumferential length.

As part of the solution a 16 port single-width module 260 is equipped with a uniquely shaped indexing latch feature at the top and bottom of the module so that the single width module 260 can be installed into the bulkhead opening while allowing the latch to be slightly offset to the left or to the right. The unique latching feature is a physically shaped bilobar hole 261A, 261B that allows the latch of single width module to be shifted to the left or to the right upon installation to align with the off center holes.

Additionally, the slotted hole on the single-width module 260 is uniquely shaped to allow a standard fastener typically used for this type of module to be fixed in place either to the left or to the right. This slotted hole is configured in a unique heart or bilobar shape so as to latch the fastener grommet either to the right of center when the single-width module is mounted in the left position or to the left of center when the single-width module is mounted to the right position. The heart shaped slot essentially indexes the latch to the left or to the right while retaining adequate strength to seat the grommet and to locate and secure the module firmly in place without subsequent shifting within the bulkhead opening.

FIGS. 6C–6H illustrate aspects of the keying mechanism used for aligning 16 and 32 output splitter modules in a desired pattern.

FIGS. 7A–7E illustrate views of an fiber distribution hub in accordance with a preferred embodiment of the present invention. The fiber distribution hub (FDH) in accordance with a preferred embodiment administers connections between fiber optic cables and passive optical splitters in the Outside Plant (OSP) environment. These enclosures are used to connect feeder and distribution cables via electromagnetic power splitters providing distributed service in a FTTP network application. The preferred embodiment FDH provides a vital cross-connect/interconnect interface for optical transmission signals at a location in the network where fiber hubbing, operational access and reconfiguration are important requirements. In addition the FDH is designed to accommodate a range of sizes and fiber counts and support factory installation of pigtails, fanouts and splitters.

Figure 7A:
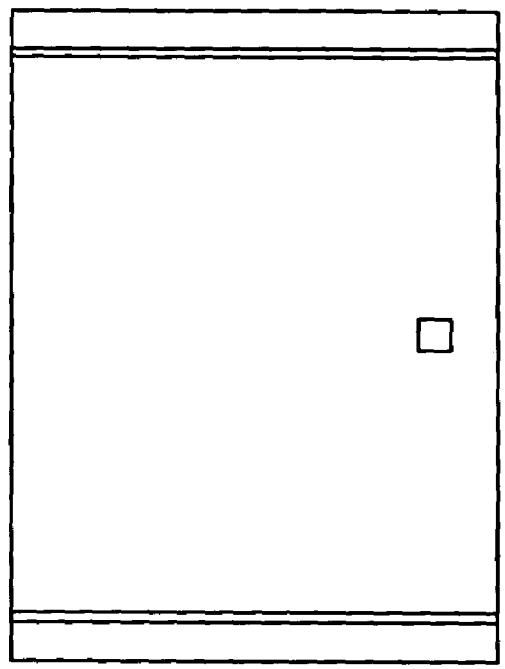
FIGS. 7A–7E illustrate views of the fiber distribution hub in accordance with preferred embodiments of the present invention.
Figure 7B:
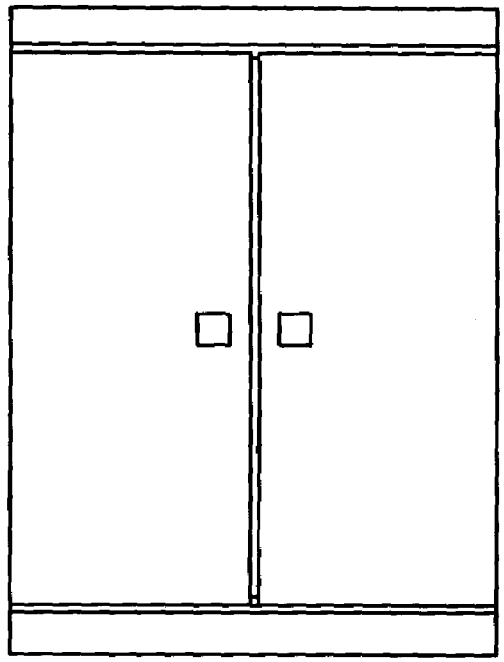
Figure 7C:
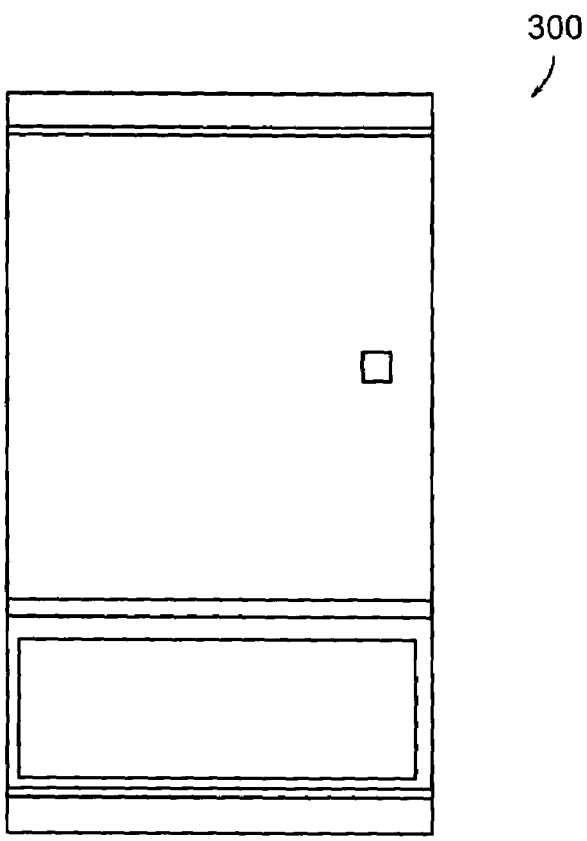
Figure 7D:
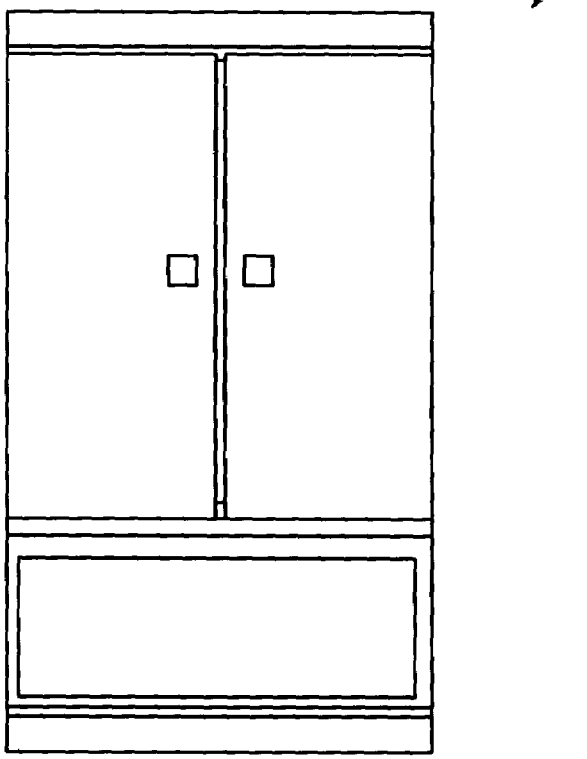
Figure 7E:
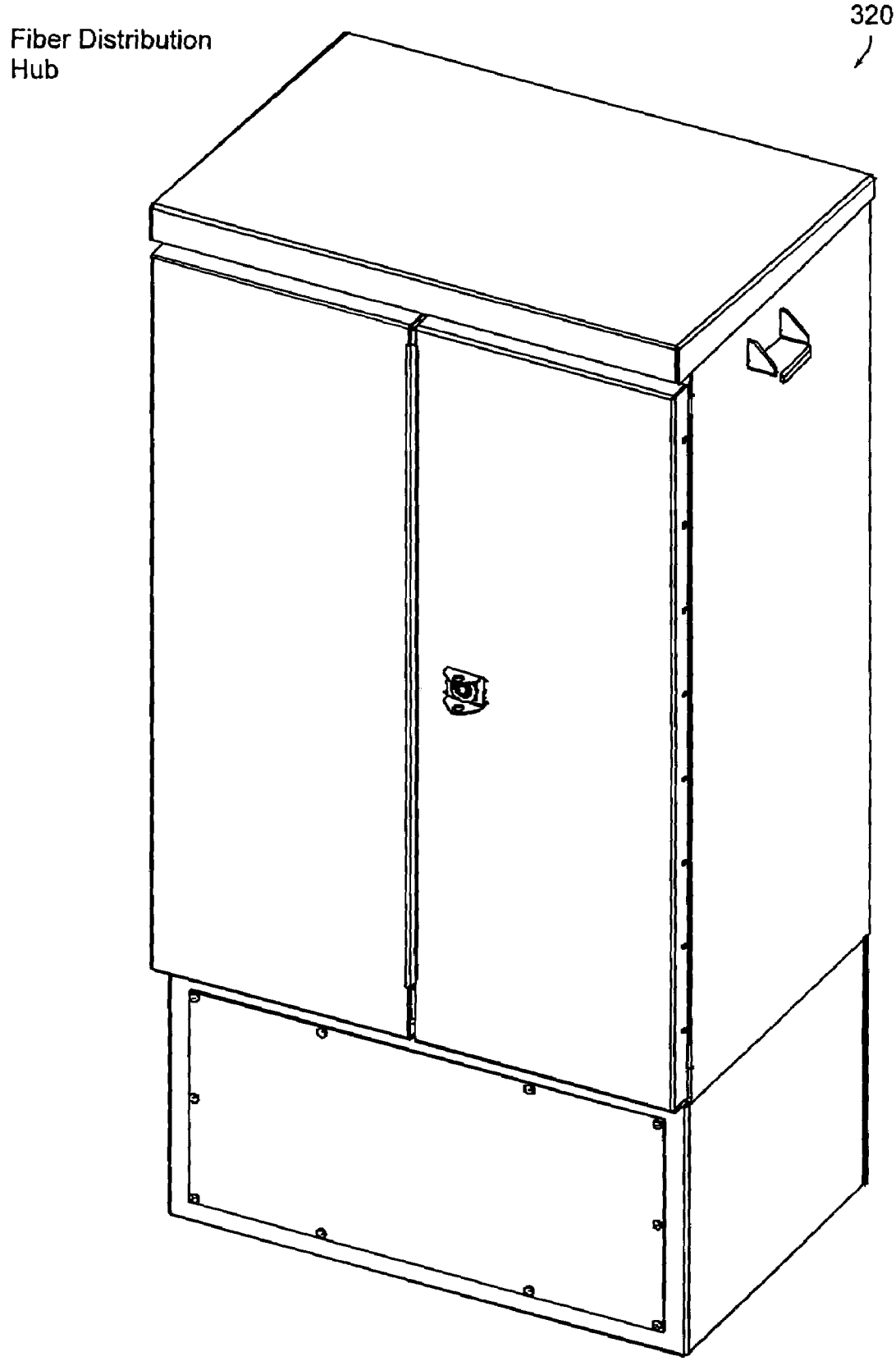

In accordance with preferred embodiments, the FDH is provided in pole mount or pedestal mount configurations. The same cabinet and working space is available in both pole mount (FIGS. 7A and 7B) and pedestal mount units (FIGS. 7C, 7D and 7E). Three sizes of FDHs are typically available, for example, to correspond to three different feeder counts, for example, 144, 216 and 432; however, additional sizes of FDHs can be used without limitation.

Embodiments of 280, 290, 300, 310, 320 FDH provide termination, splicing, interconnection and splitting in one compartment. The enclosures accommodate either metallic or dielectric OSP cables via sealed grommet entry. Cables are secured with standard grip clamps or other means known in the art. The FDH may also provide grounding for metallic members and for the cabinet.

Enclosures 280, 290, 300, 310, 320 provide environmental and mechanical protection for cables, splices, connectors and passive optical splitters. These enclosures are typically manufactured from heavy gauge aluminum and are NEMA-4X rated and provide the necessary protection against rain, wind, dust, rodents and other environmental contaminants. At the same time, these enclosures remain lightweight for easy installation, and breathable to prevent accumulation of moisture in the unit. An aluminum construction with a heavy powder coat finish also provides for corrosion resistance. These enclosures are accessible through secure doors that are locked with standard tool or pad-lock.

FIG. 8 illustrates a view of the internal components of a fiber distribution hub enclosure 350 in accordance with a preferred embodiment of the present invention. FDH enclosure 350 can be configured in a number of different ways to support fiber cable termination and interconnection to passive optical splitters. The configuration illustrated in FIG. 8 provides for a termination shelf 352, a splitter shelf and optical component modules 354, a splice shelf 356, and a channel for fiber management 358.

Termination shelf 352 can be based on the standard main distribution center (MDC) enclosure line that provides complete management for fiber terminations in accordance with a preferred embodiment of the present invention. In a preferred embodiment, the termination shelf is preterminated in the factory with a stub cable containing either 144-fibers, 216-fibers or 432-fibers. This stub cable is used to connect services to distribution cables routed to residences. The distribution fibers are terminated on certified connectors. The termination shelf may use standard 12-pack or 18-pack adapter panels, for example, that have been ergonomically designed to provide easy access to fiber terminations in the field. These panels can be mounted on a hinged bulkhead to allow easy access to the rear for maintenance. The fiber jumpers are organized and protected as they transition into the fiber management section 358 of the enclosure.

The splitter shelf 354 can be based on a standard fiber patch panel that accepts standard optical component modules (OCM) holding optical splitters in accordance with a preferred embodiment of the present invention. In a preferred embodiment, the splitter modules, or cassettes, are designed to simply snap into the shelf and therefore can be added incrementally as needed. The splitter shelf 354 serves to protect and organize the input and output fibers connected to the cassettes. Splitter shelves 354 are available in various sizes and the shelf size can be optimized for different OCM module configurations.

Figure 9:
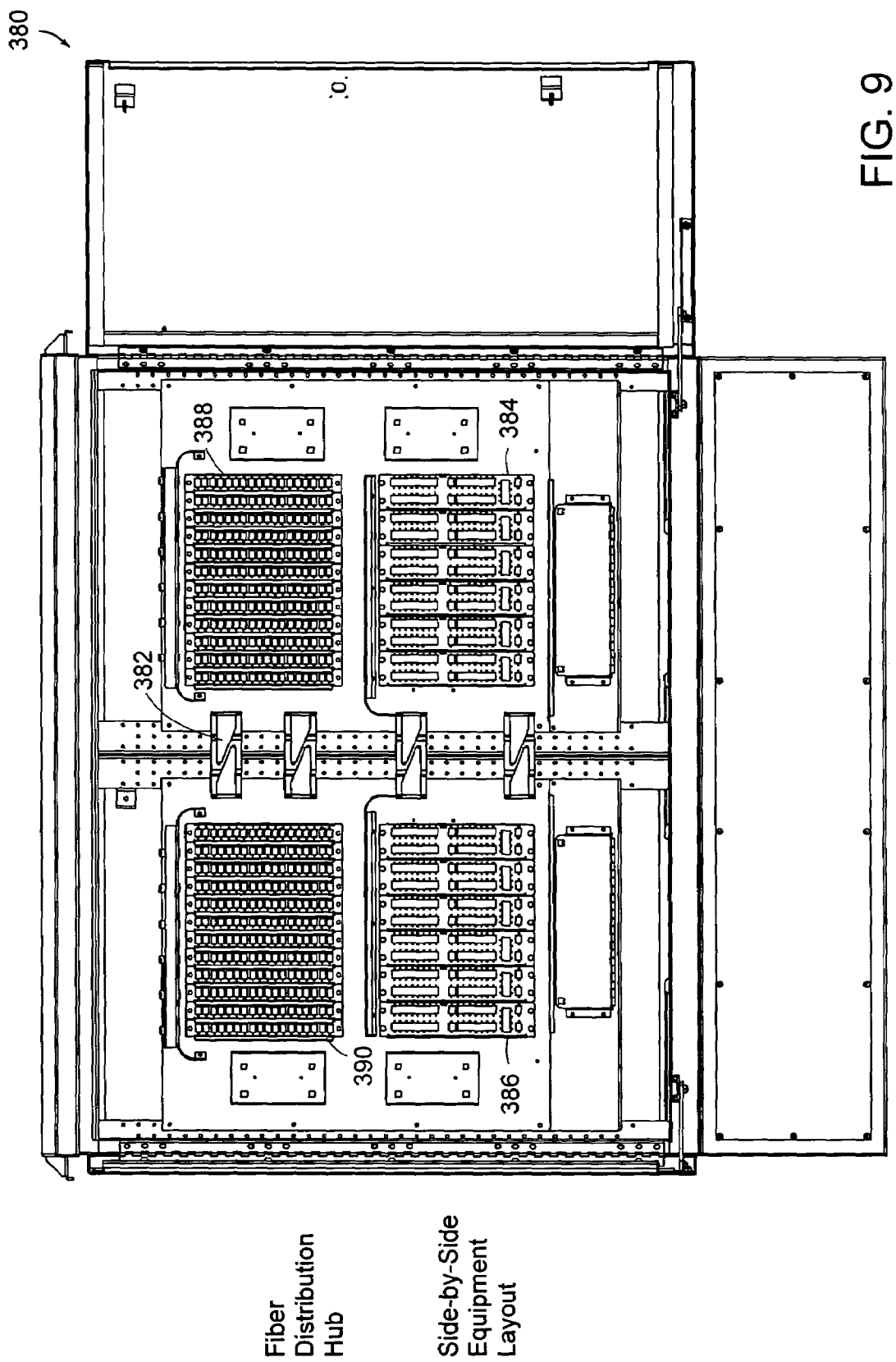
FIG. 9 illustrates a schematic view of a fiber distribution hub enclosure having a side-by-side equipment configuration in accordance with a preferred embodiment of the present invention.

FIG. 9 illustrates a schematic view of a fiber distribution hub enclosure 380 having a side-by-side equipment configuration in accordance with a preferred embodiment of the present invention. There are two adjacent termination shelves 388, 390 and two adjacent splitter shelves 384, 386, separated by a central fiber management channel 382 in accordance with a preferred embodiment of the present invention.

FDHs may be installed on utility poles or in pedestal arrangements that require the rear of the enclosure to remain fixed. In these situations, it is not possible to access cables or fiber terminations through the rear of the cabinet. Normal administration of an FDH may require that a linesman access the rear of the termination bulkhead to perform maintenance operations on the rear connectors. One such operation is cleaning a connector to remove dirt or contamination that might impair the performance of components therein. In addition, the rear of an FDH enclosure may have to be accessed for trouble shooting fibers such as may occur with fiber breakage or crushing of a fiber. Furthermore, it may be necessary to access the rear of the enclosure for adding cables as in a maintenance upgrade or as is the case when performing a branch splice to route designated fibers to alternate locations using an FDH as a point of origin. In circumstances such as those identified immediately above, access to the rear of the enclosure may be difficult if a rear door or access panel is not provided. Gaining access to the rear of such an enclosure may require disassembly of the equipment chassis and/or cabling apparatus to provide access to the fiber connectors or cables.

Arrangements for providing access behind the chassis must be carefully planned so as to minimize the movement of working fibers. For instance, an arrangement may be devised to move the terminations and not the splitter pigtails. Such an arrangement may place undue stress on the terminations and/or pigtails because one section of the apparatus is moved, while another remains stationary. Apparatus that include partial movement to access connectors may not be suitable for adding additional capacity to and maintenance of, the cabling system. Sliding apparatus trays or tilting bulkhead panel apparatus may tend to create stress points in fiber cables and block certain other areas of the chassis for maintenance access, and therefore may not be a desirable alternative to enclosures having removable back panels.

Figure 10:
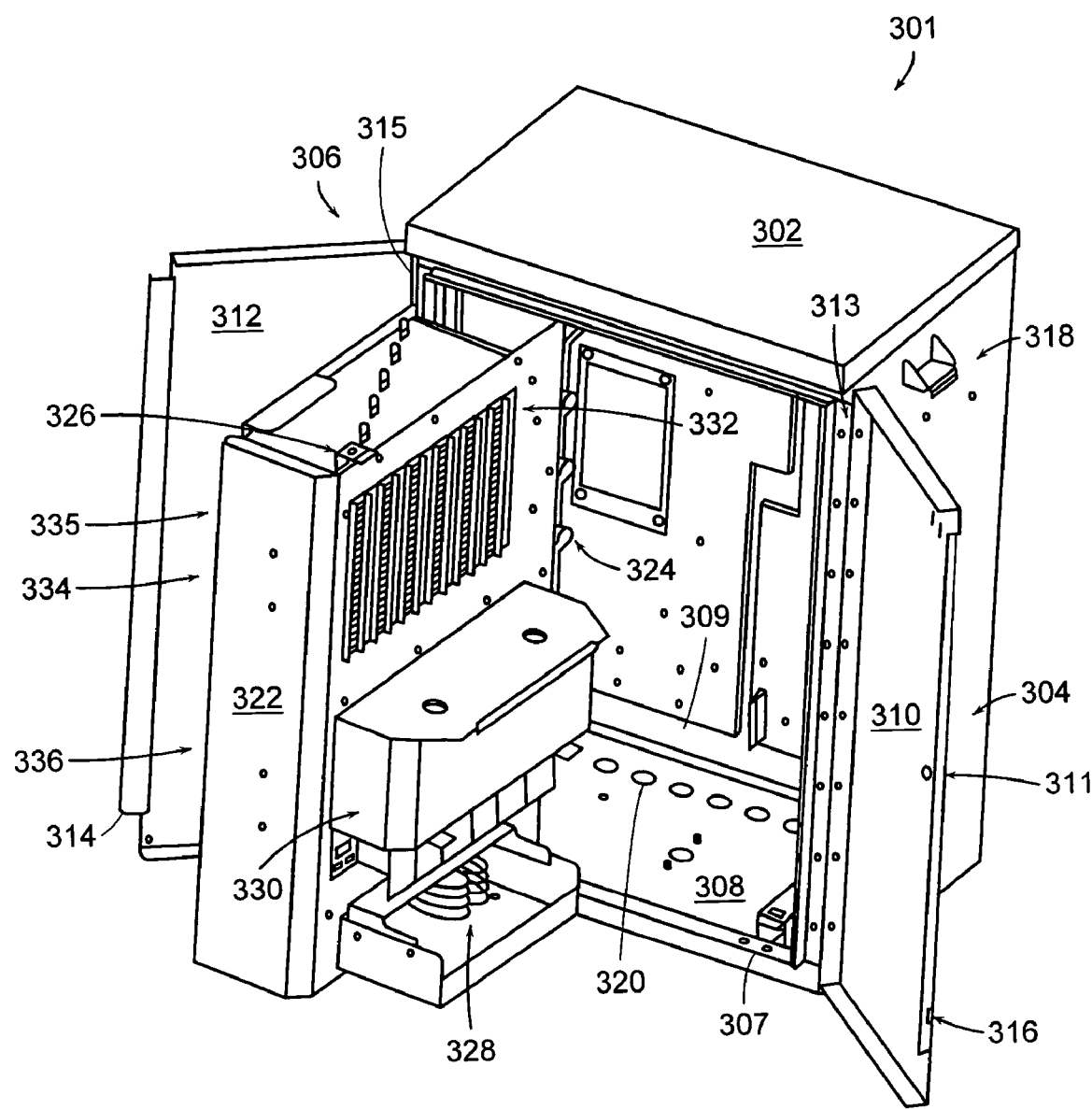
FIG. 10 illustrates an embodiment of an FDH employing a hinged chassis in accordance with an aspect of the invention.

FIG. 10 illustrates a preferred embodiment of an FDH enclosure 301 that is designed with a unique swing frame chassis 322 that swings the entire chassis including optical connectors, splitters and splices open 90 degrees or more to allow access to all optical components for cleaning and testing and to cables for maintenance or additions. The swing frame design provides the necessary provisions to add additional cables into the unit for future use which may require complete access to the back of the cabinet. For example, access to rear penetrator punch-outs 320 is possible with the swing chassis in the opened position. Weather proof feed-throughs can be installed when the punch-outs are removed and multi-fiber cables can then be passed through the feed-throughs and into the enclosure.

An embodiment of FDH cabinet 301 comes equipped with a single point swing frame release latch 326 that provides easy access to the rear and securely locks the chassis into place when closed. In addition, locks can be provided to hold the chassis open at various angular increments to reduce the chances of injury to a linesman when working on components located behind the bulkhead 335. Chassis 322, when equipped with locks for holding it open, is referred to as a self-locking chassis. In the embodiment of FIG. 10, the entire chassis is hinged providing a single point of flex for the fiber cable routed to the chassis. This hinge point is carefully constructed in the factory to control the fiber bend; and, therefore the fiber bend at the hinge point is not subjected to craft handling in the field. In particular, chassis hinge 324 and cable routing hardware are designed to ensure that manufacture recommended bend radii are not violated when the chassis is opened or closed. For example, chassis 322 may have pigtail channels 153A, B attached thereto so that the slack associated with the pigtails remains fixed as chassis 322 is moved throughout its range of motion.

In addition, transitions 131 and transition storage area 133 can be located on chassis 322. In this configuration, transitions 131 may be accessed from above when chassis 322 is in an open position. In order to ensure that input fibers and pigtails are not disturbed or distorted in an impermissible manner, enclosure 300 may be configured at a factory, or plant, so as to have cable bundles dressed around hinge 324. Preconfiguring enclosure 300 reduces the chance that cabling will be done incorrectly.

In particular, a preferred embodiment of enclosure 301 includes, among other things, a top panel 302, a first side panel 304, a second side panel 306, a bottom panel 308, a back panel 309, a first door 310 and a second door 312 which collectively make up the exterior dimensions and structure of the enclosure 301. In addition, enclosure 301 may include one or more carry handles 318 for facilitating deployment of enclosure 301 at a desired location. First and second doors 310 and 312 may each be pivotally mounted by way of a hinged edge 313, 315 to facilitate access to components mounted within enclosure 301. In addition, first and second doors 310, 312 may employ a lip 316 and channel 314 assembly to facilitate tamper resistance and weatherproofing. Channel 314 may operate in conjunction with elastomeric gasket material to further facilitate a weatherproof seal. Enclosure 300 may further include ledge 307 running along an interior portion of top surface 302, first side surface 304, second side surface 306 and bottom surface 308 to additionally facilitate a weatherproof seal when first and second doors 312, 314 are closed. A lock 311 can be installed in a door to discourage unauthorized access to the interior volume of enclosure 301.

Enclosure 301 includes a swinging frame 322 that is hinged along a side using hinge 324. Hinge 324 allows frame 322 to be pivoted so as to cause the side opposing hinge 324 to move away from the interior volume of enclosure 301. When frame 322 is in the open position, as shown in FIG. 10, rear feed throughs 320 are accessible along with cable management tray 328, splitter chassis rear cover 330 and rear termination connections 332.

In contrast, when swing frame 322 is in the closed position, only components on front bulkhead 335 are readily accessible. For example, termination field bulkhead 334 and splitter chassis bulkhead 336 are accessible when swing frame 322 is in the closed position.

The trend to higher capacity fiber distribution hubs creates additional concerns regarding rear access to optical components and cables. Along with other dimensions of the enclosure the width of the chassis must be increased to accommodate increased termination capacity that includes increased number of connectors, splitter modules, splices and fiber jumpers. In addition to the issues described in conjunction with the swing frame chassis of FIG. 10, additional issues may arise as the width of a swing frame FDH chassis 322 is increased.

As the width of the swing frame chassis 322 is increased the width of the cabinet must be increased proportionately to accommodate clearance between a swing frame chassis and the side wall of the enclosure as the chassis swings open. At a certain point the width of the entire cabinet grows beyond conventionally acceptable widths, especially for utility pole installations, when the swing frame chassis is utilized therein. While the chassis width needs to be increased to accommodate, say for example, a larger termination field, proportionally increasing the size of the swing frame chassis may not be acceptable due to the addition of even more width to the enclosure to accommodate a swinging frame.

Figure 11A:
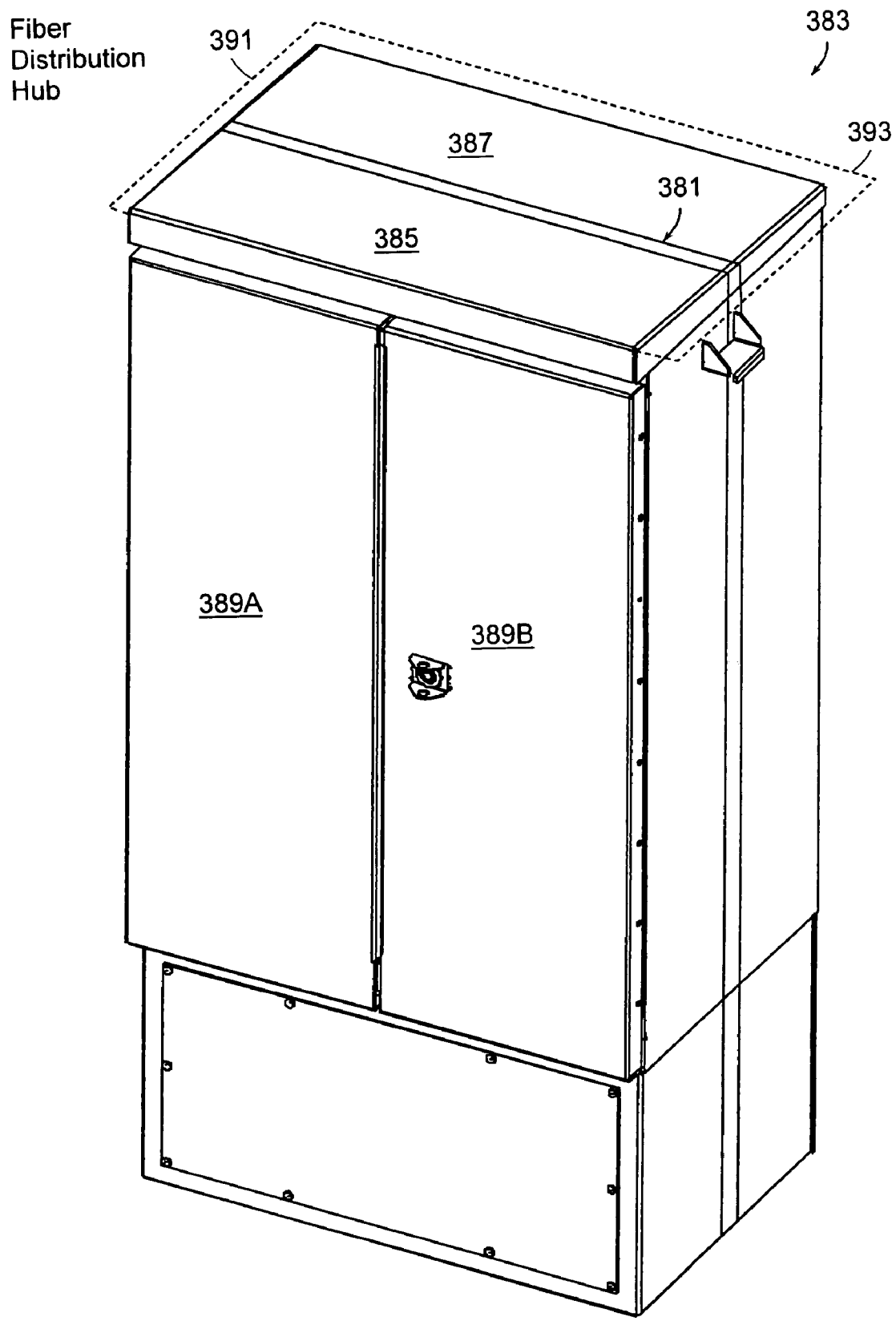
FIG. 11A illustrates an embodiment of an FDH utilizing a split enclosure.

FIG. 11A illustrates an embodiment of a fiber distribution hub 383 capable of accommodating large termination fields and large swinging frames associated therewith while minimizing the additional enclosure width necessary to accommodate the swinging frame 322. Hub 383 may include, among other things, a rear enclosure portion 387, a front enclosure portion 385, a seam 381 and one or more access door panels. Hub, as illustrated, includes a first access door 389A and 389B. Hub 383 includes an enclosure designed with a vertical split 381 in the entire side wall of the enclosure thus allowing the front chassis section of the enclosure to be completely separated and hinged away from the back section of the enclosure which remains fixed. The split in the enclosure means that the entire closure is split and therefore a reduction in the overall enclosure width needed to achieve a swing frame chassis configuration, since the additional width that would be necessary to allow clearance between the swing frame chassis and the side of the enclosure is largely eliminated. The split enclosure is accomplished by using a particularly strong back section 387 designed as the sole fixed, or stationary, structural member of the enclosure. The enclosure is split at a position along the depth to provide enough side wall stiffness to the back section 387 so as to ensure structural integrity for the entire chassis via the back section and a rugged hinge.

Since an FDH is typically an environmental enclosure, the split 381 in the enclosure must be sealed to protect against water and other environmental factors. Thus the back section and the chassis are joined with a compression seal in split 381 that serves as an environmental barrier. To accomplish environmental sealing the robust hinge 391 serving to support the entire chassis section of the enclosure is located outside the moisture seal to allow a continuous seal to be routed around the split. In addition the entire back section of the enclosure is covered by the top rain shield 393 that provides a roof for the entire enclosure including the split section. The hinge is designed and configured so as to manage the bend radii of fibers in an acceptable manner.

Furthermore the split section is joined by two quick release latches located within the enclosure and accessed only through the front doors. These latches quickly actuate the release to split the chassis section away from the back to provide rapid access. The latches easily draw the cabinet back together and provide compression to complete the environmental seal on the split when closed. Enclosure 383 may further be equipped with angled cable entry channels for carrying moisture away from the cable seals. The angled entry way, if employed, is associated with the rear section of the enclosure.

The back section 387 of the enclosure provides a unique cable management scheme to provide rear or side entry. Rear entry is provided in much the same way as conventional enclosures via an angled fixture to carry moisture away from the cable seals. The back section of the split enclosure is designed so that the side sections are large enough to accept the same fixtures thus allowing side cable entry into the enclosure as well.

Figure 11B:
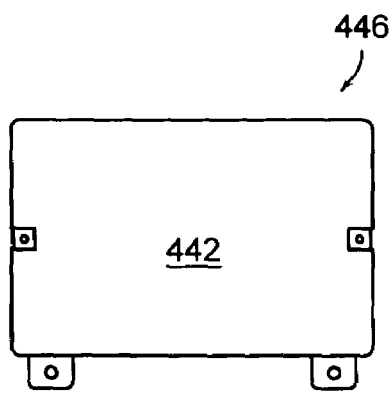
FIG. 11B–11G illustrate various aspects and embodiments of an FDH having a split enclosure.
Figure 11C:
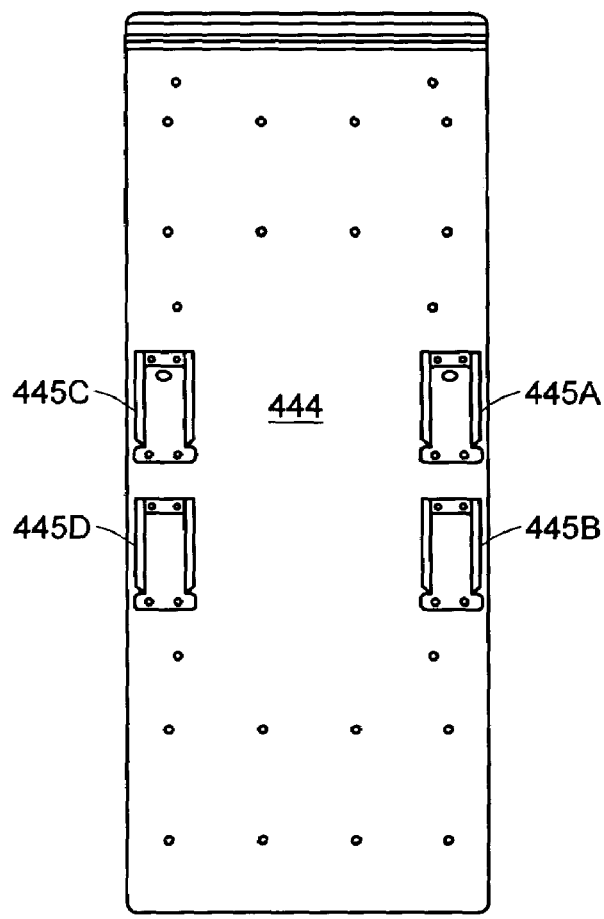
Figure 11D:
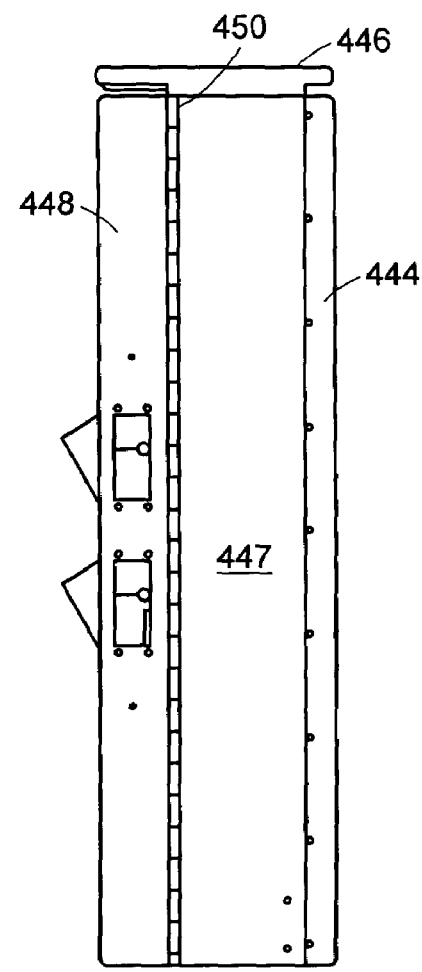
Figure 11E:
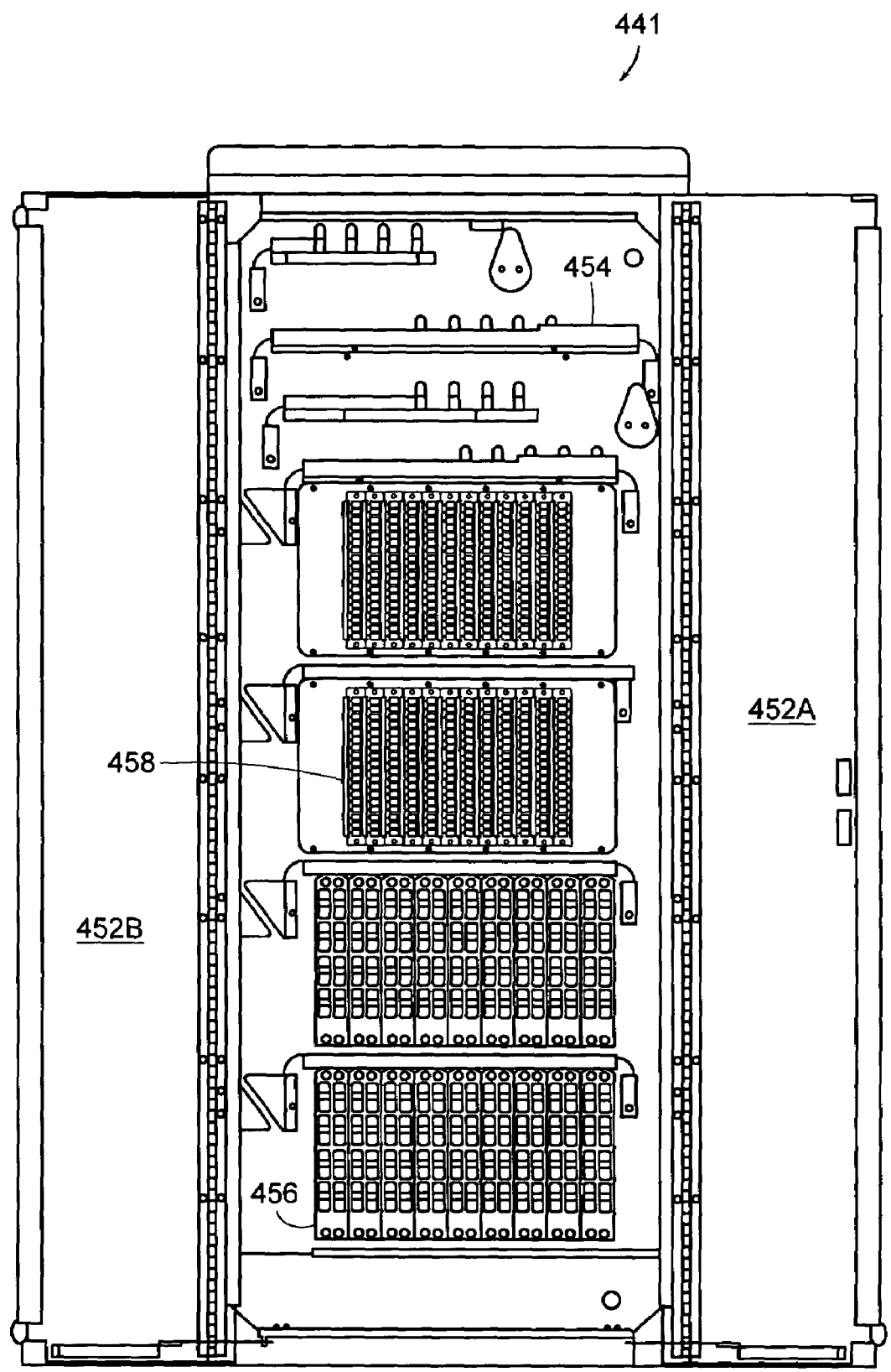
Figure 11F:
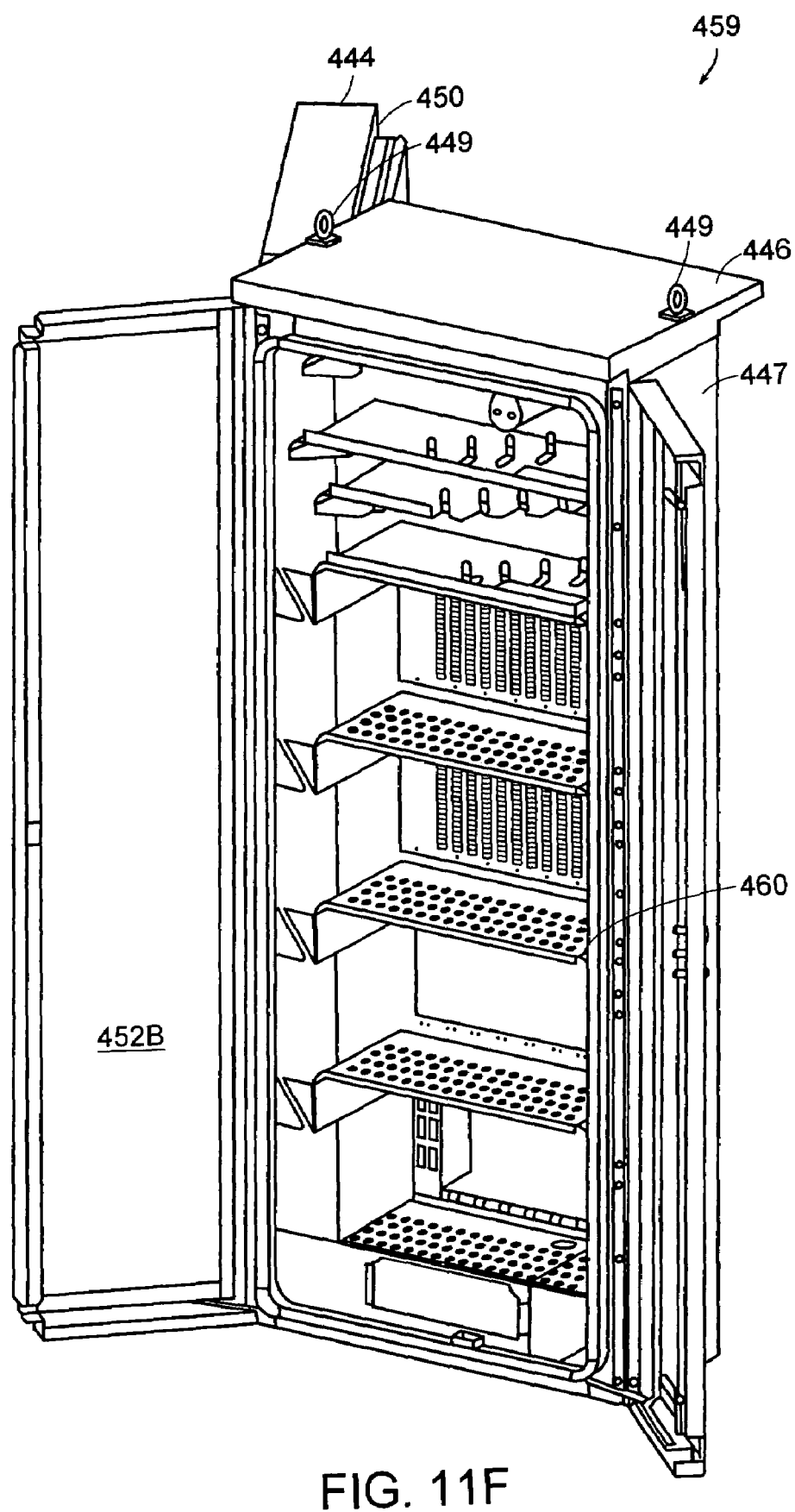
Figure 11G:
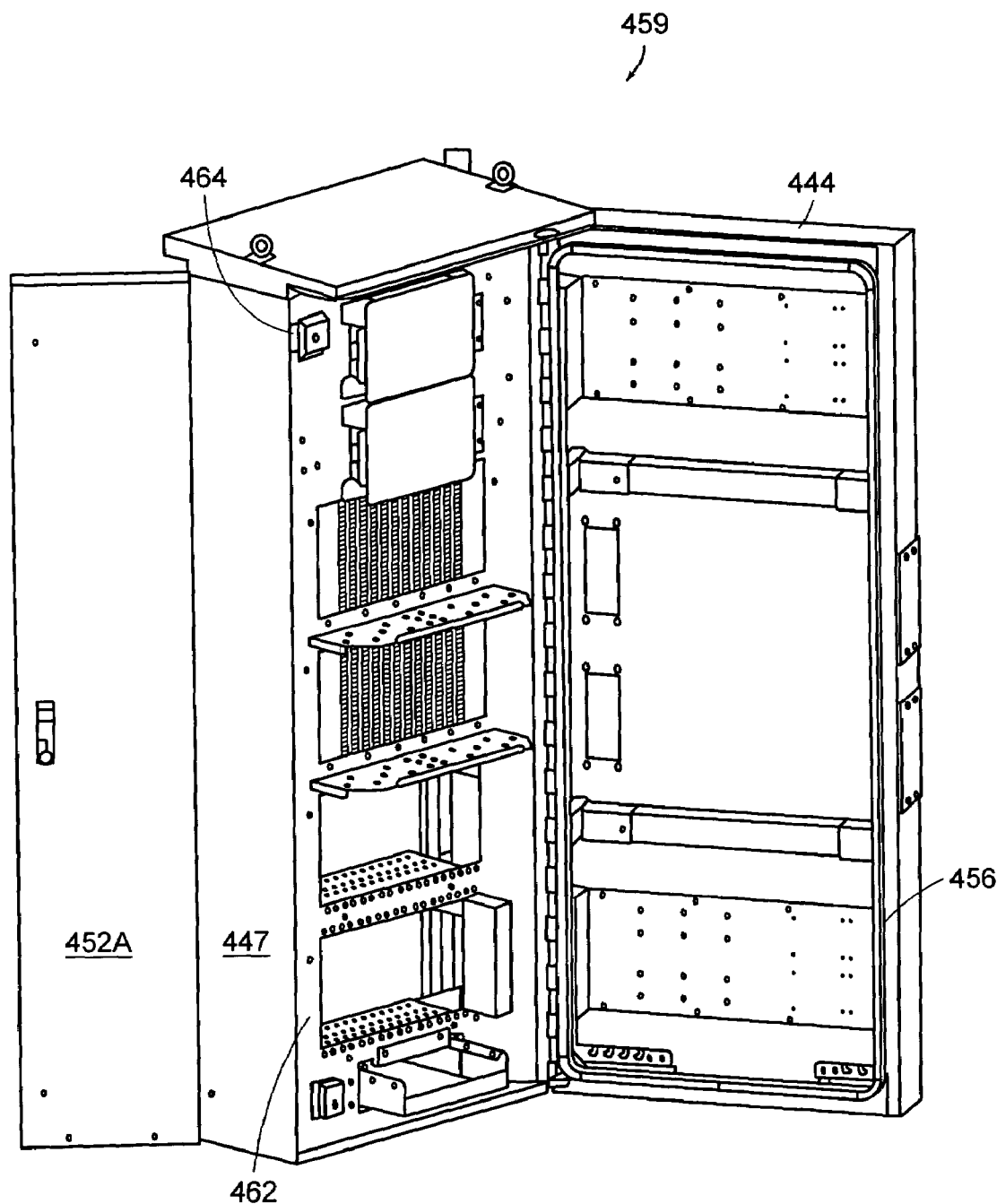

FIGS. 11B–11G further illustrate embodiments of split enclosures. FIG. 11B illustrates a top view of enclosure 440 showing top surface 442 consisting of a rain shield 446. FIG. 11C illustrates a view showing rear surface 444 and utility pole mounting brackets 445A–D. FIG. 11D illustrates a side view of enclosure 440 showing rain shield 446, front portion 448, central portion 447 and rear portion 444. In the embodiment of FIG. 11D, rear portion 444 remains fixed by way of being supported on a utility pole. Central portion 447 is pivotally attached to rear portion using a hinge and front portion 448 is pivotally attached to central portion 447 using a hinge 450. FIG. 11E illustrates a front view of an enclosure 441 showing, among other things, an optical splitter mounting area 456, a subscriber termination field 458, a cable raceway 454 and a first door 452A and a second door 452B. FIG. 11F illustrates an enclosure 459 having rear portion 444 and gasket 450 pivotally attached to central portion 447. Central portion 447 is in an open position and is disengaged from rear portion along 3 edges. Enclosure 459 further includes shelves 460, optical splitter module mounting areas, subscriber termination fields, etc. FIG. 11G illustrates a perspective view showing the rear portion of enclosure 459. Latches 464 retain central portion 447 in a closed position.

Figure 11H:
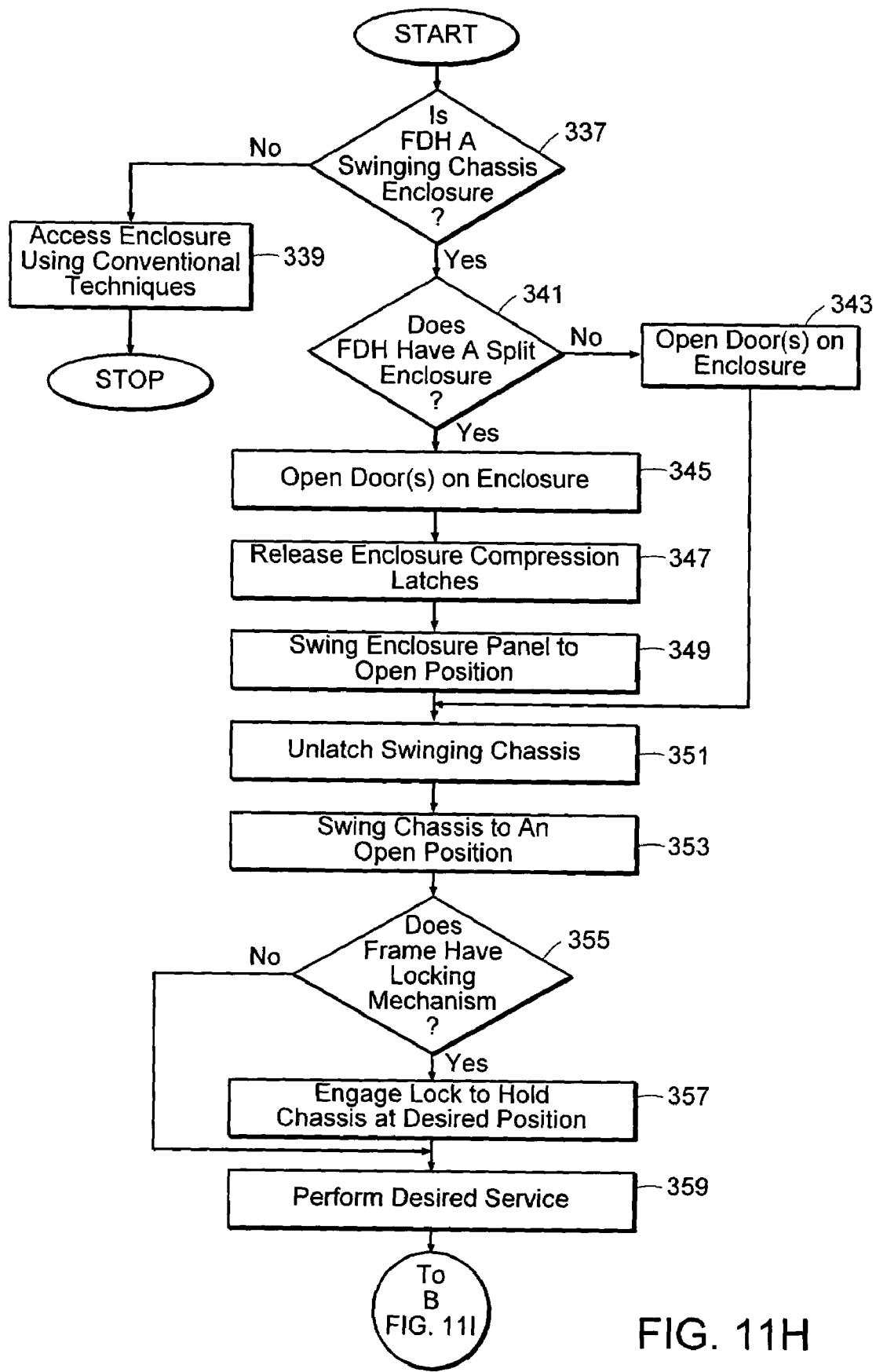
FIGS. 11H and 11I illustrate an exemplary method for using an FDH enclosure having a split housing.
Figure 11I:
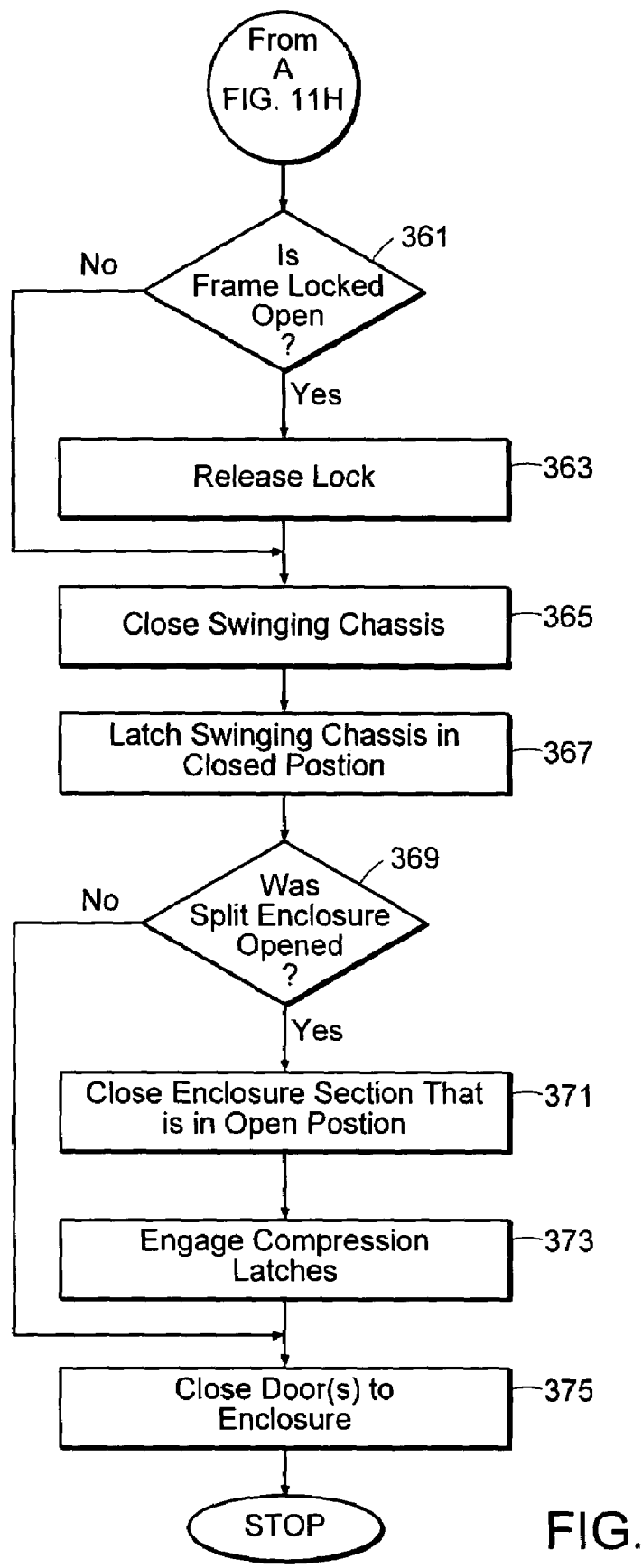

FIGS. 11H and 11I, together, illustrate an exemplary method for using embodiments of FDH enclosures employing one or more swinging chasses. First, a determination is made as to whether the enclosure utilizes a swinging chassis 322 (step 337). If no swinging chassis is used, the enclosure is accessed using conventional techniques known in the art (step 339). If a swinging chassis 322 is identified in step 337, a determination is made as to whether the enclosure is a split enclosure (step 341). If the enclosure is not a split enclosure, the enclosure doors are opened (step 343) and the method flow goes to the input of step 351. In contrast, if a split enclosure is identified in step 341, the enclosure doors are opened (step 345) and then one-or-more compression latches are released (step 347).

Compression latches are used to keep the gasket of the enclosure in compression to facilitate weatherproofing. After the compression latches are released, the flexible portion of the enclosure is moved to its opened position (step 349). After step 349, the method flow from the No path of step 341 rejoins the main method flow. The swinging chassis 322 is unlatched (step 351) and the chassis is pivoted to an open position (step 353).

After the chassis is in the open position, a determination is made as to whether the chassis frame is equipped with a locking mechanism to keep the frame at a desired angle with respect to the enclosure (step 355).

If no locking mechanism is present, the method flow goes to the input of step 359. In contrast, if a locking mechanism is present, the lock is engaged to hold the open chassis at a determined position (step 357). Next, a desired service is performed (step 359). By way of example, a desired service may include repairing damaged or worn components within the enclosure, inspecting components within the enclosure, connecting a subscriber, disconnecting a subscriber, adding additional components such as optical splitter modules to the enclosure, or removing components from the enclosure.

Now referring to FIG. 11I, after service is performed, a determination is made as to whether the chassis frame is locked in an open position (step 361). If the chassis is not locked in the open position, method flow goes to the input of step 365. In contrast, if the frame is locked open, the lock is released (step 363). The chassis is then closed (step 365) and latched in the closed position (step 367).

A determination is then made as to whether a split enclosure is in the opened position (step 369) If a split enclosure was not used, method flow goes to the input of step 375. In contrast, if a split enclosure was used and is open, the appropriate enclosure section is closed (step 371) and the compression latches are engaged (step 373). The doors to the enclosure are then closed (step 375) and locked if needed.

FDH enclosures are commonly mounted to utility poles at an elevation which cannot be accessed by a linesman standing on the ground; and therefore, the linesman typically accesses the enclosure by climbing to the elevation of the enclosure. Often, enclosures are installed in conjunction with a utility platform or balcony that is a permanent fixture attached to the pole below the enclosure that allows the linesman to stand in front of the enclosure while making circuit connections. A linesman typically climbs a ladder or steps to the elevation of the balcony and then transfers to the platform to conduct operations. Standard safety procedures used in the art require that the linesman latch into appropriate safety mechanisms in conjunction with a safety harness to break a fall should a fall occur while climbing the ladder, transferring to the balcony, or while working on the platform. Provisions for safety latching and access are typically provided along with enclosure installations such as FDH installations.

Enclosures fabricated for use in copper plant installations (such as plain old telephone system, or POTS installations) were typically fabricated from heavy gauge steel and thus provided adequate strength for latching safety harnesses directly to the enclosure. However, new enclosures are constructed from aluminum or other lightweight, corrosion-resistant materials to provide easier installation and to provide added protection against long term exposure to the elements. These lightweight enclosures do not provide adequate structural strength to reliably break a fall if a safety line is attached thereto.

In typical field operations, a linesman may transfer from a ladder to the platform, or balcony, to begin work on an elevated enclosure. Safety procedures dictate that the linesman first attaches a safety line to an appropriate structure, herein a latching point, on the pole before making the transfer. In order to encourage attachment of the safety line to an appropriately designed structure, embodiments use a safety structure that is easily accessible, and optimally located, to the linesman while on the ladder. In addition, the safety structure provides necessary mobility to the linesman as he transfers from the ladder to the platform and while he works on the enclosure. In addition, a structurally sound handle is provided for supporting the linesman's weight as the transfer from ladder to platform is made. The latching point and handle are mounted on both sides of the pole and mounted enclosure since it cannot be determined ahead of time, with certainty, from which side of the pole the linesman will ascend to the platform.

Preferred embodiments of an elevated FDH include a latching point in conjunction with a structural member which can be installed as an option with a pole mounted FDH. Use of the optional member, allows installation of a latching point equipped FDH only in circumstances where it is desired. For those situations where a latching point is not needed, the FDH is provided with a standard mounting bracket. Still other embodiments of the elevated FDH provide for a standard mounting bracket that is capable of post installation augmentation by the addition of a structural member and latching point should it be desired after an initial installation of the FDH. Since the latching point and/or structural member may incur damage if they are used to break a fall or over the normal course of use, embodiments of the elevated FDH utilize field-replaceable latching points and structural members.

Figure 12A:
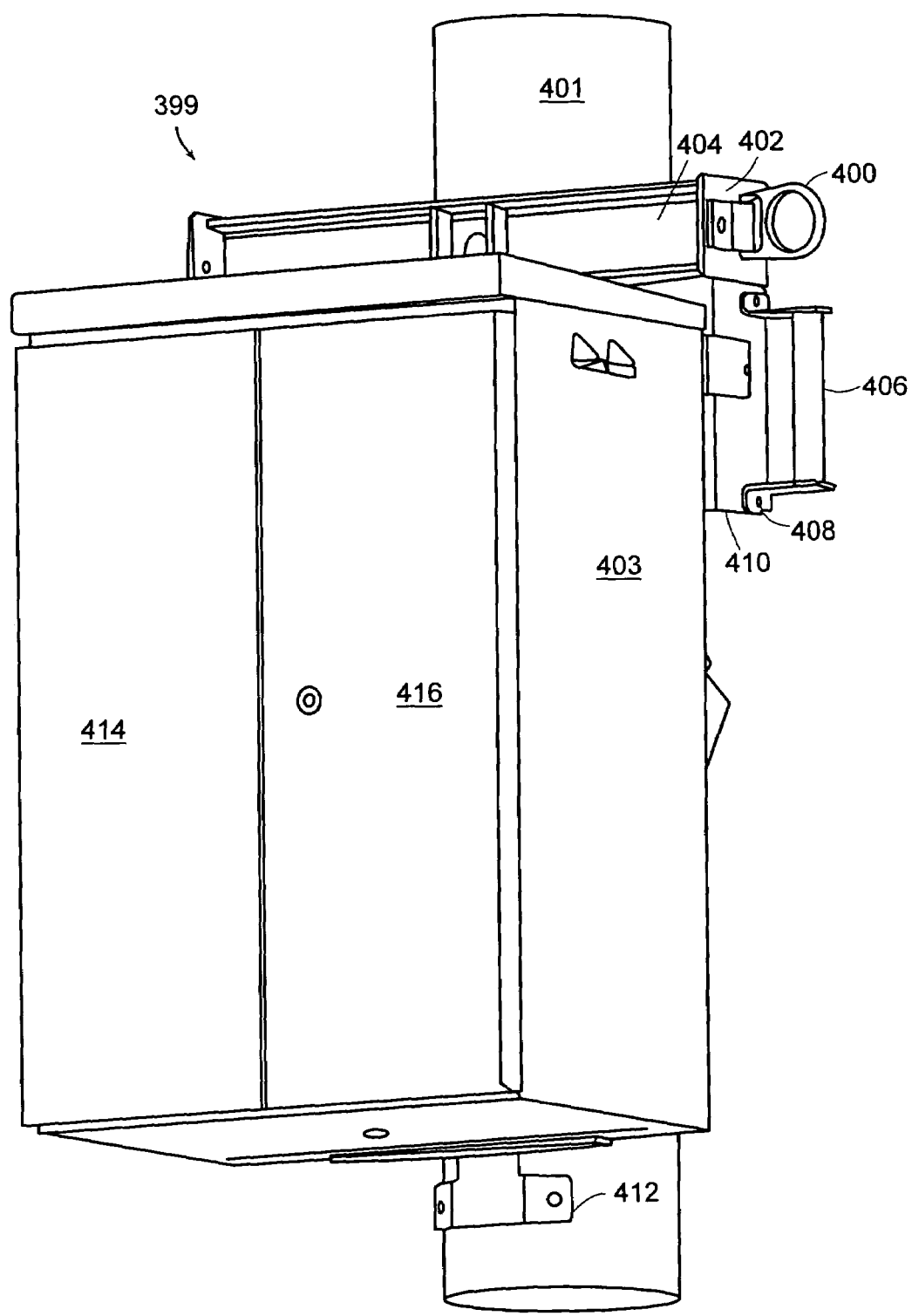
FIG. 12A illustrates an embodiment of a utility pole mounted FDH having fall restraint hardware integrated therewith.

FIG. 12A illustrates a preferred embodiment of an elevated FDH 399 mounted to a utility pole 401 using a structural member 404 having a latching point 400. Structural member, or stabilization bar, 464 serves as a heavy mounting bracket that can optionally be equipped with a heavy duty safety latch 400 attached to the bar along with a handle 406 that can be releasably attached to the enclosure mounting bracket using bolts 408. The structural stabilizer bar 404 is constructed, for example, from a heavy duty steel beam such as a welded beam and provides adequate strength to transfer the load of the accidental fall directly to the utility pole 401 without relying on the strength of the elevated FDH enclosure 403. In a preferred embodiment, bar 404 spans the entire width of the enclosure 399. In addition, latching points 400 are located so that a linesman can access them from the front, side or back of FDH 399. Furthermore, latching points 400 are located so that the safety line can be draped over a door of FDH 399 while a linesman works inside the enclosure. While steel is used in a preferred embodiment of the structural stabilizer bar 404, other materials such as aluminum, titanium and composite can be used for the beam if desired, providing that the material cross sectional dimensions are altered appropriately for the specific material to achieve the necessary load bearing capability. In addition, the shape of the structural stabilizer bar can be changed. Stabilizer bar 404 may be mounted directly to pole 401 or it may be mounted to an intervening structure which is in turn mounted to pole 401. Additionally, stabilizer bar 404 can be demounted as desired.

In the embodiment of FIG. 12A, the latching point consists of a safety latch 400 made from a heavy-duty "D-Ring" loop that is sized to allow fastening of the standard linesman's safety harness thereto and further having sufficient strength to restrain a linesman under accidental fall conditions. Safety latch 400 is replaceable and may be specified to be replaced after a single fall. As such, the safety latch is designed to be easily replaced using fasteners such as bolts 401 in conjunction with bracket 402. A handle 406 is also provided in the illustrated embodiment. Handle 406 fastens onto the side of the pole mount bracket to facilitate a linesman's transfer from a ladder to a platform. In particular, handle 406 may be mounted to a flange 410 on structural member 404 and is positioned to assist a linesman while transferring from the ladder to the pole 401. For example, a linesman climbing the pole 401 will latch the safety harness to the "D-Ring" 400, and then hold the handle 406 while transferring from the ladder to a secure position on the balcony in front of the elevated FDH enclosure.

A typical installation of the elevated FDH enclosure will include two "D-Rings" and two handles with one of each mounted on either side of the enclosure. To help ensure the safety of the linesman, handle 406 is designed so that it will not accept the latch from the linesman's safety harness because handle 406 may not rated for an accidental fall load. This safety feature is achieved by increasing the diameter on handle 406 beyond a diameter that will function with the safety latch 400 while. still keeping the diameter of the handle to an acceptable range for a normal linesman's hand to grasp. As a result, the linesman is forced only to connect to "D-Rings" 400 that are rated in accordance to the safety harness and accidental fall requirements.

Figure 12B:
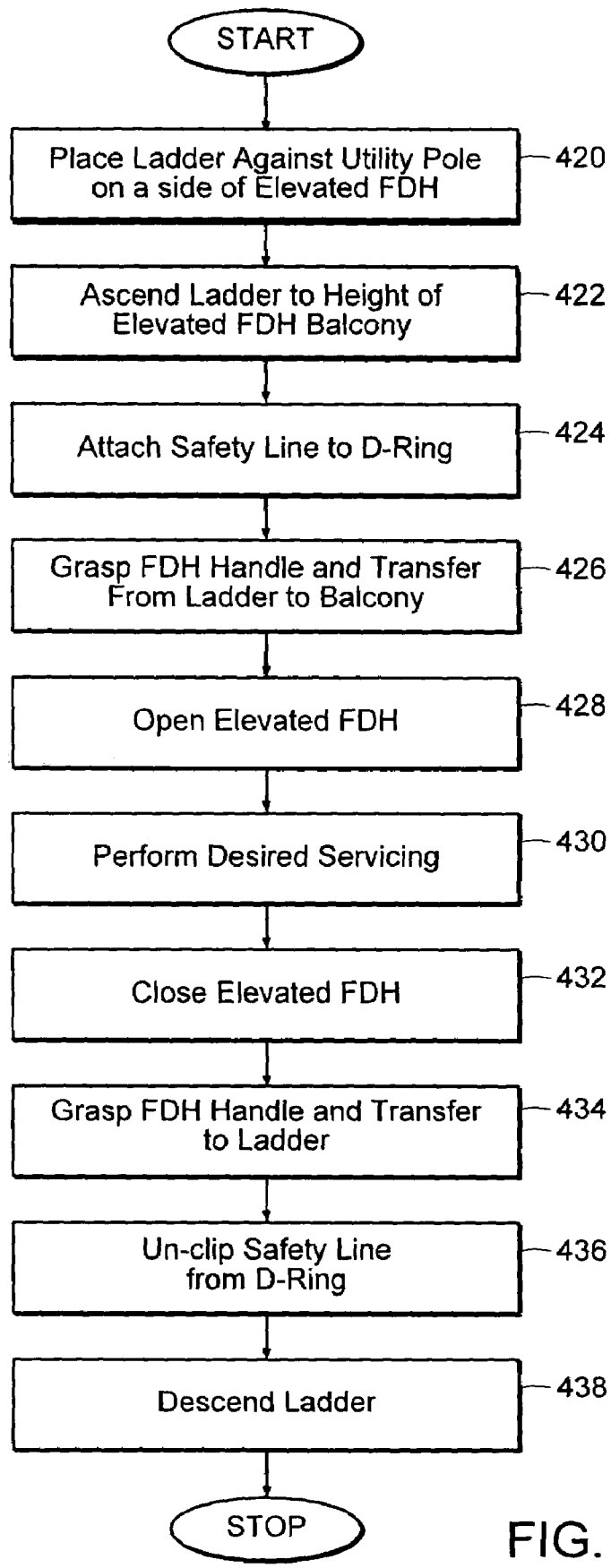
FIG. 12B illustrates a method for accessing and elevated FDH.

FIG. 12B illustrates an exemplary method for using an elevated FDH enclosure 399 equipped with a handle 406 and D-ring 400. The method of FIG. 12B commences when a linesman places a ladder against a utility pole 401 having an elevated FDH 399 mounted thereto (step 426). The linesman climbs the pole to the height of a balcony associated with elevated FDH 399 (step 422). Then the linesman attaches a safety line, rated for stopping a fall, to D-ring 400 (step 424). The linesman then grasps handle 406 and transfers from the ladder to the balcony (step 426).

Once on the balcony, the linesman opens doors 414 and 416 to gain access to components located within the interior volume of elevated FDH 399 (step 428). Any necessary servicing is performed (step 430) and then doors 416, 416 are closed (step 432). The linesman then grasps handle 406 and transfers to the ladder (step 434). The safety line is unclipped from the D-ring 400 (step 436) and the linesman descends the ladder (step 438).

Figure 13:
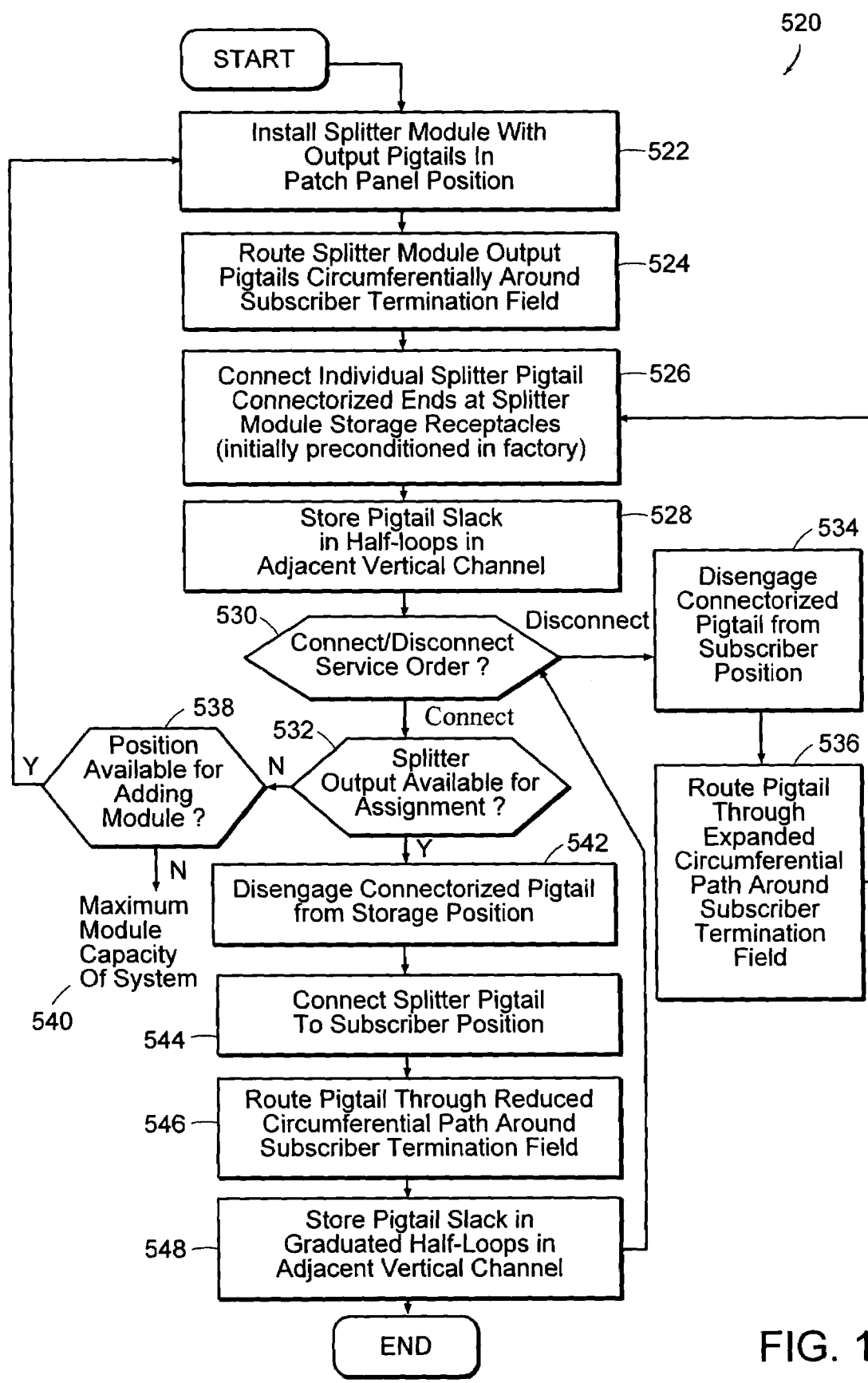
FIG. 13 is a flow chart illustrating a method for installing and connecting optical splitter module pigtails in accordance with a preferred embodiment of the present invention.

FIG. 13 is a flow chart illustrating a method for installing and connecting optical splitter module pigtails in accordance with a preferred embodiment of the present invention. The method includes the step 522 of installing a splitter module with output pigtails in a patch panel position. Further, the method includes the step 524 of routing the splitter module output pigtails circumferentially around a subscriber termination field. The method includes the step 526 of connecting an individual splitter pigtail connectorized ends at splitter module storage receptacles. These storage receptacles can be initially preconditioned in the factory. The method includes a next step 528 of storing the pigtail slack in half-loops in an adjacent vertical channel. Further, the method includes the step 530 of deciding whether to connect or disconnect the service order. If a service order needs to be connected, the method includes the decision in step 532 of determining if a splitter output is available for assignment. If it is determined that the splitter output is available for assignment then the method progresses to step 542 of disengaging connectorized pigtail from the storage position. If it is determined that the splitter output is not available per step 538 then it is determined if a position is available for adding a module. If Yes, then the method steps are reiterated starting back from step 522. If, however, it is determined that there is no position available then the maximum module capacity of the system has been reached.

The method also includes the option of disconnecting the service order per step 534. The step 534 includes disengaging the connectorized pigtail from the subscriber position and per step 536 routing the pigtail through an expanded circumferential path around the subscriber termination field 536.

The method further includes the step 544 of connecting the splitter pigtail to the subscriber position and the step 546 of routing the pigtail through a reduced circumferential path around the subscriber termination field. The method includes the step 548 of storing the pigtail slack in graduated half-loops in an adjacent vertical channel.

Figure 14A:
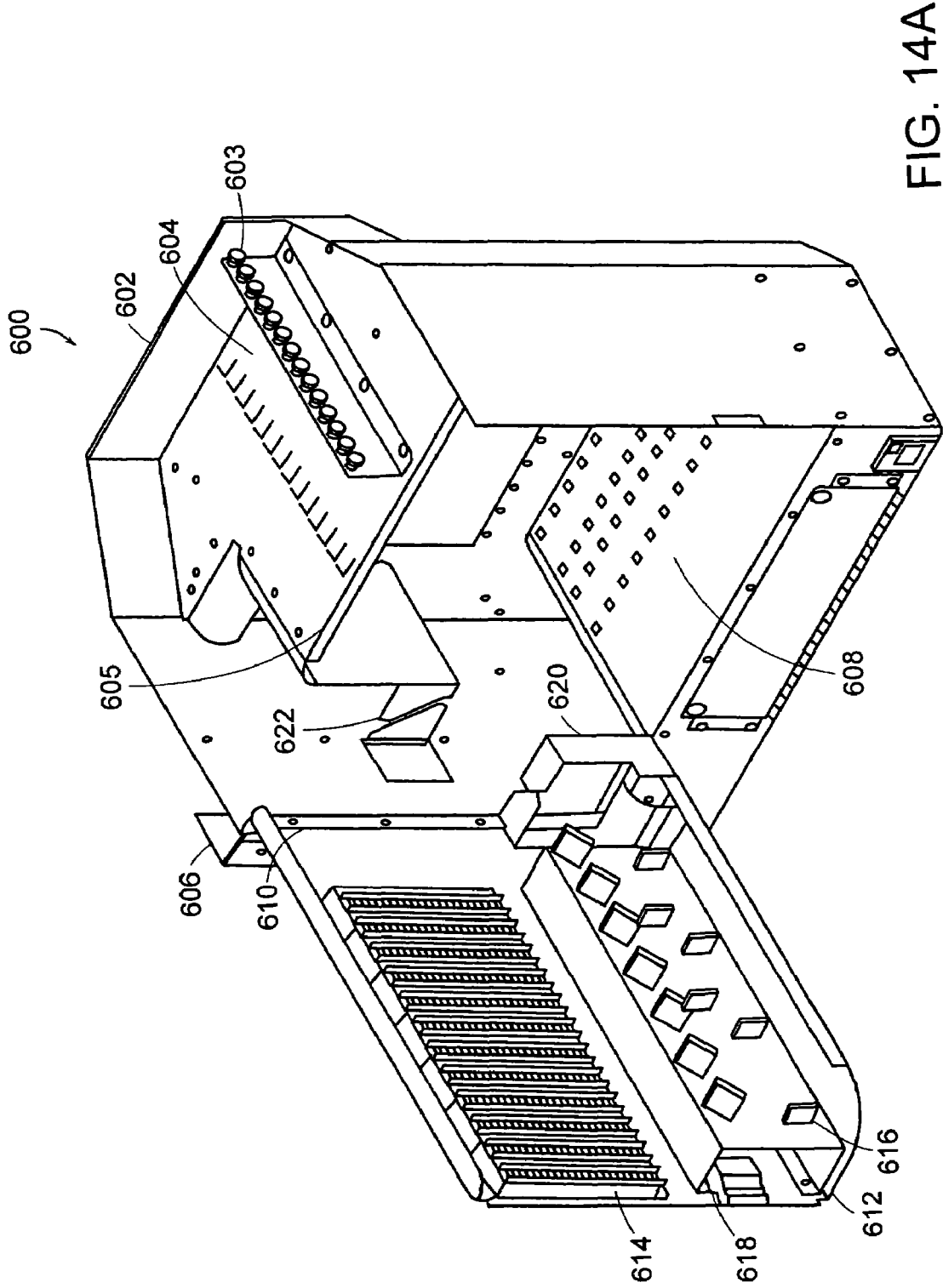
FIG. 14A illustrates a preferred embodiment of a single hinged parking panel for use in fiber distribution hubs.

Alternative embodiments for interior components of FDHs may be practiced in accordance with teachings herein. By way of example, hinged parking panels may be employed for storing unused pigtails. FIG. 14A illustrates a chassis 600 utilizing hinged parking. The embodiment of FIG. 14A may include, among other things, a chassis frame 602, module retainers 603, a splitter module mounting area 604, an upper splitter module shelf 605, a mounting bracket 607 for pivotally mounting chassis frame 602 and storage/parking panel 612 to an interior surface of an enclosure, an inner volume 608, a storage panel hinge 610, storage parking panel 612, a parking portion having a plurality of receptacles 614, fiber pigtail guides 616, a fiber pigtail guide panel 618, a storage panel primary guide 620, and a chassis fiber guide 622.

Chassis frame 602 has an inner volume 608 for accepting a subscriber termination field. Chassis 602 also includes a splitter module shelf 605 for supporting splitter modules above a subscriber termination field. Splitter modules are retained in place using retainers 603. Fiber pigtails having connectorized ends, are routed through chassis cable guide 622, panel primary guide, and one-or-more panel mounted fiber pigtail guides 616 before being stored in parking receptacle field 614.

Hinged storage/parking panel 612 provides greater fiber connector density than embodiments utilizing splitter modules having storage receptacles thereon and located below a subscriber termination field. In addition, storage receptacles 6*y*14 can be organized in columns of 16 or 32 receptacles so as to correspond to a splitter module having 16 or 32 pigtails. As pigtail connectors are removed from storage receptacles 614 and deployed onto subscriber termination field, columns of receptacles can be removed from hinged panel 612 and re-used in FDHs at other locations. Furthermore, once all pigtails are deployed on subscriber termination field, the entire hinged panel 612 can be removed thus providing unencumbered access to the termination field. In addition, hinged panel 612 can be sized to serve as a protective cover for the subscriber termination field. If gasketing, or other releasable sealing means, is provided, then hinged panel 612 can operate to prevent dust and debris from accumulating on the subscriber termination field.

Figure 14B:
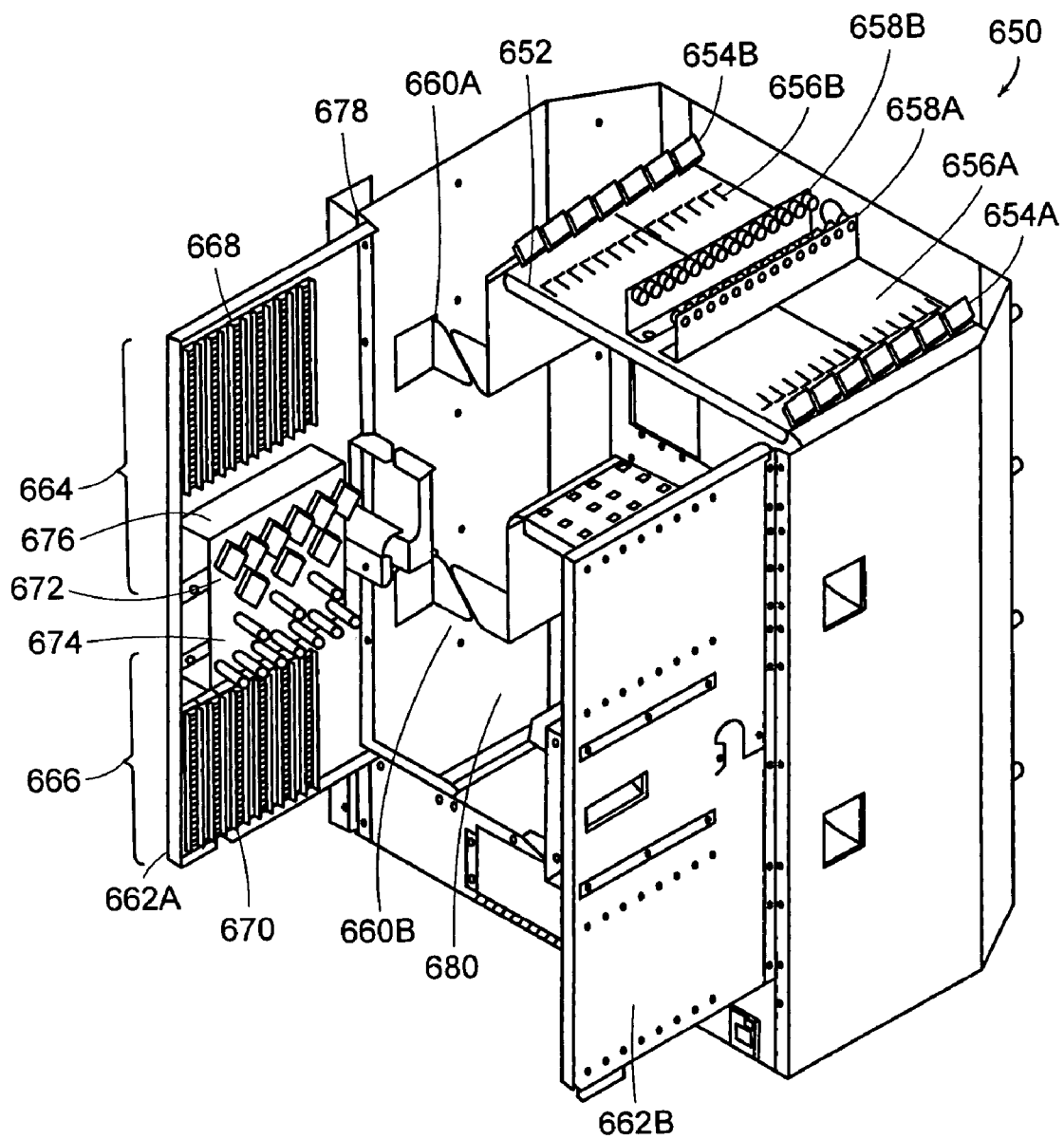
FIG. 14B illustrates a preferred embodiment of a dual hinged parking panel for use in fiber distribution hubs.

FIG. 14B illustrates an embodiment of a chassis having two doors containing connector parking. Embodiment 650 may include, among other things, a chassis 651, an upper splitter module shelf 652 having a first module area 656A, a second module area 656B, a first set of module guides 654A, a second set of module guides 654B, a first set of module retainers 658A, a second set of module retainers 658B, an upper chassis fiber guide 660A, a lower chassis fiber guide 660B, a first door panel 662A having a lower parking management area 666, an upper parking management area 664, an upper and lower parking field 668, 670, panel upper fiber guides 672, panel lower guides, an inner volume 680 and a first door panel 662B having substantially the same configuration as the first door panel 662A. The embodiment of FIG. 14B operates in substantially the same manner as the embodiment of FIG. 14A except that the receptacles for parking a splitter module outputs are contained on two hinged door panels 662A, 662B. The chassis embodiments of FIGS. 14A and 14B may be used with enclosures mounted on grade as well as enclosures supported on utility poles.

The claims should not be read as limited to the described order or elements unless stated to that effect. Therefore, all embodiments that come within the scope and spirit of the following claims and equivalents thereto are claimed as the invention.

What is claimed:

1. A fiber distribution hub comprising:
an enclosure;
a swing frame pivotably mounted within the enclosure, the swing frame including a bulkhead dividing the enclosure into a front and a back, the swing frame configured to pivot from a first position to a second position;
a subscriber termination field mounted on the bulkhead of the swing frame, the subscriber termination field including a plurality of front termination connections facing the front of the enclosure and a plurality of rear termination connections facing the back of the enclosure, the front termination connections being accessible when the swing frame is in the first position, the rear termination connections being accessible when the swing frame is in the second position; and
at least one optical splitter mounted on the swing frame.

2. The fiber distribution hub of claim 1, wherein the subscriber termination field is mounted on an upper portion of the swing frame and the at least one optical splitter is mounted on a lower portion of the swing frame.

3. The fiber distribution hub of claim 1, wherein the swing frame includes a hinge about which the swing frame pivots, thereby providing a single point of flex for cable routed to the swing frame.

4. The fiber distribution hub of claim 1, wherein the front section of the swing frame further comprises a fiber management section.

5. The fiber distribution hub of claim 1, wherein the swing frame is configured to pivot about 90 degrees out of the enclosure.

6. The fiber distribution hub of claim 1, wherein the back of the enclosure is accessible when the swing frame is in the second position.

7. The fiber distribution hub of claim 6, wherein the back of the enclosure includes rear feed-throughs configured to enable additional fibers to enter the enclosure.

8. The fiber distribution hub of claim 1, further comprising storage receptacles mounted to the swing frame.

9. The fiber distribution hub of claim 8, wherein the storage receptacles are mounted on a lower portion of the swing frame and the subscriber termination field is mounted on an upper portion of the swing frame.

10. The fiber distribution hub of claim 9, wherein the storage receptacles are located on a bulkhead coupled to the at least one optical splitter.

11. The fiber distribution hub of claim 8, wherein the storage receptacles include half non-functioning adapters.

12. The fiber distribution hub of claim 1, wherein the optical splitter is coupled to a plurality of connectorized pigtails.

13. A fiber distribution hub comprising:
- an enclosure;
- a swing frame pivotably mounted within the enclosure, the swing frame having a front and a back, the swing frame configured to pivot from a first position to a second position;
- a subscriber termination field mounted on the swing frame, the subscriber termination field including a plurality of front termination connections facing the front of the enclosure and a plurality of rear termination connections facing the back of the enclosure, each of the plurality of front termination connections being associated with one of the plurality of rear termination connections, the front termination connections being accessible when the swing frame is in the first position, the rear termination connections being accessible when the swing frame is in the second position;
- at least one optical splitter mounted on the swing frame;
- a distribution cable extending into the enclosure, the distribution cable having at least one optical fiber routed to the at least one splitter;
- a plurality of pigtail fibers routed from the optical splitter, each of the plurality of pigtail fibers configured to carry a signal split from the at least one optical fiber of the distribution cable, each pigtail fiber being terminated at a connector configured to couple to one of the plurality of front termination connections of the subscriber termination field; and
- a subscriber cable extending out from the enclosure, the subscriber cable having at least one optical fiber, the at least one optical fiber coupled to one of the rear termination connections of the subscriber termination field.

14. The fiber distribution hub of claim 13, further comprising connector holders mounted on a lower portion of the swing frame, the connector holders configured to temporarily store the connectors of the plurality of pigtail fibers routed from the optical splitter.

15. The fiber distribution hub of claim 13, wherein the swing frame is configured to pivot about 90 degrees out of the enclosure.

16. The fiber distribution hub of claim 13, wherein the optical splitter is accessible when the swing frame is in the first position.

17. A fiber distribution hub comprising:
- an enclosure having a front and a back, the front of the enclosure defining an opening covered by an access door;
- a swing frame pivotably mounted within the enclosure, the swing frame configured to pivot from a first position to a second position;
- at least one optical splitter mounted on the swing frame;
- a distribution cable extending into the enclosure, the distribution cable including at least one optical fiber coupled to the at least one optical splitter;
- a subscriber termination field mounted on the swing frame, the subscriber termination field including a plurality of front termination connections facing the front of the enclosure and a plurality of rear termination connections facing the back of the enclosure, the front termination connections being accessible when the swing frame is in the first position, the rear termination connections being accessible when the swing frame is in the second position;
- a plurality of pigtail fibers routed from the optical splitter, each of the plurality of pigtail fibers configured to transmit an optical signal split from the at least one optical fiber of the distribution cable, each pigtail fiber having a connectorized end, each connectorized end configured to couple to one of the plurality of front termination connections of the subscriber termination field;
- a storage position located on the swing frame, wherein at least one of the connectorized ends of the plurality of pigtails fibers is mounted at the storage position prior to coupling the connectorized end to one of the plurality of front termination connections; and
- a subscriber cable extending out from the enclosure, the subscriber cable having at least one optical fiber, the at least one optical fiber coupled to one of the rear termination connections of the subscriber termination field.

18. The fiber distribution hub of claim 17, wherein the storage position is located on a lower portion of the swing frame and the subscriber termination field is mounted on an upper portion of the swing frame.

19. The fiber distribution hub of claim 17, further comprising connector holders mounted at the storage position for temporarily storing the connectorized ends of the pigtail fibers before the connectorized ends are coupled to the front termination connections.

20. The fiber distribution hub of claim 19, wherein the connector holders include half non-functional adapters.

21. The fiber distribution hub of claim 17, wherein the at least one optical splitter includes a plurality of optical splitters mounted to the swing frame, each of the optical splitters coupled to a plurality of pigtail fibers having connectorized ends.

22. The fiber distribution hub of claim 17, wherein the storage position is located on a bulkhead coupled to the optical splitter.

23. The fiber distribution hub of claim 17, wherein the connectorized ends of the plurality of pigtails are accessible when the swing frame is in the first position.

24. The fiber distribution hub of claim 17, wherein the optical splitter is accessible when the swing frame is in the first position.

25. The fiber distribution hub of claim 17, wherein the swing frame pivots through the front of the enclosure when the access door is open.

26. The fiber distribution hub of claim 25, wherein the swing frame is configured to pivot about 90 degrees through the front of the enclosure.

* * * * *